(12) United States Patent
Yang et al.

(10) Patent No.: US 11,043,993 B2
(45) Date of Patent: Jun. 22, 2021

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Seonwook Kim, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/318,671

(22) PCT Filed: Sep. 10, 2018

(86) PCT No.: PCT/KR2018/010573
§ 371 (c)(1),
(2) Date: Jan. 17, 2019

(87) PCT Pub. No.: WO2019/050368
PCT Pub. Date: Mar. 14, 2019

(65) Prior Publication Data
US 2020/0358487 A1 Nov. 12, 2020

Related U.S. Application Data

(60) Provisional application No. 62/555,707, filed on Sep. 8, 2017, provisional application No. 62/577,779, filed (Continued)

(30) Foreign Application Priority Data

Apr. 5, 2018 (KR) .................. 10-2018-0039471

(51) Int. Cl.
*H04B 7/0456* (2017.01)
*H04W 76/30* (2018.01)
(Continued)

(52) U.S. Cl.
CPC ......... *H04B 7/0456* (2013.01); *H04L 1/1664* (2013.01); *H04L 1/1819* (2013.01);
(Continued)

(58) Field of Classification Search
CPC .. H04B 7/0456; H04W 76/30; H04W 72/042; H04W 72/0493; H04L 1/1664; H04L 1/1819; H04L 5/0055
See application file for complete search history.

(56) References Cited

U.S. PATENT DOCUMENTS

2011/0243066 A1* 10/2011 Nayeb Nazar ........ H04L 5/0048
370/328
2012/0320826 A1* 12/2012 Kim ..................... H04L 1/1671
370/328
(Continued)

FOREIGN PATENT DOCUMENTS

CN   105978669 A   9/2016
JP   2017017371 A   1/2017
(Continued)

OTHER PUBLICATIONS

R1-1714016, XP051316808: 3GPP TSG RAN WG1 #90, Prague, Czech Republic, Aug. 21-25, 2017, Nokia, Nokia Shanghai Bell, "On HARQ feedback determination," (6 pages).
(Continued)

*Primary Examiner* — Jael M Ulysse
(74) *Attorney, Agent, or Firm* — Denton US LLP

(57) ABSTRACT

The present invention relates to a wireless communication system. More particularly, the present invention relates to a method including receiving only one downlink signal in a set of slots; generating an acknowledgement/negative acknowledgement (A/N) codebook for the one or more downlink signals; and transmitting the A/N codebook, wherein if a specific condition is satisfied, the A/N codebook
(Continued)

includes only A/N information for the one downlink signal, and an apparatus therefor.

18 Claims, 12 Drawing Sheets

Related U.S. Application Data on Oct. 27, 2017, provisional application No. 62/586,880, filed on Nov. 15, 2017, provisional application No. 62/616,466, filed on Jan. 12, 2018, provisional application No. 62/630,319, filed on Feb. 14, 2018, provisional application No. 62/656,927, filed on Apr. 12, 2018, provisional application No. 62/675,135, filed on May 22, 2018, provisional application No. 62/675,104, filed on May 22, 2018, provisional application No. 62/716,953, filed on Aug. 9, 2018.

(51) Int. Cl.
*H04L 1/16* (2006.01)
*H04L 1/18* (2006.01)
*H04L 5/00* (2006.01)
*H04W 72/04* (2009.01)

(52) U.S. Cl.
CPC ......... *H04L 5/0055* (2013.01); *H04W 72/042* (2013.01); *H04W 72/0493* (2013.01); *H04W 76/30* (2018.02)

(56) References Cited

U.S. PATENT DOCUMENTS

| | | | | |
|---|---|---|---|---|
| 2012/0327875 | A1* | 12/2012 | Han | H04L 1/0031 370/329 |
| 2013/0128857 | A1* | 5/2013 | Nakao | H04L 5/0032 370/329 |
| 2014/0071952 | A1* | 3/2014 | Kim | H04L 5/001 370/335 |
| 2014/0078974 | A1* | 3/2014 | Falahati | H04W 52/146 370/329 |
| 2014/0092790 | A1* | 4/2014 | Zhang | H04L 5/0053 370/280 |
| 2014/0328292 | A1* | 11/2014 | Yang | H04W 72/042 370/329 |
| 2015/0049676 | A1* | 2/2015 | Tiirola | H04W 72/1205 370/329 |
| 2015/0078223 | A1* | 3/2015 | Yang | H04L 1/1861 370/280 |
| 2015/0131494 | A1* | 5/2015 | He | H04W 72/046 370/280 |
| 2015/0341923 | A1* | 11/2015 | Yang | H04L 5/001 370/329 |
| 2015/0351091 | A1* | 12/2015 | Yang | H04B 7/2643 370/329 |
| 2017/0041923 | A1 | 2/2017 | Park | |
| 2017/0134140 | A1 | 5/2017 | Park | |
| 2018/0324810 | A1* | 11/2018 | Zhang | H04W 72/0466 |

FOREIGN PATENT DOCUMENTS

| | | |
|---|---|---|
| KR | 10-1397840 B1 | 5/2014 |
| KR | 10-2016-0062090 A | 6/2016 |
| KR | 10-1739267 B1 | 5/2017 |
| KR | 10-2017-0094190 A | 8/2017 |
| WO | 2011084013 A2 | 7/2011 |

OTHER PUBLICATIONS

R1-123448, XP050661327: 3GPP TSG RAN WG1 #70, Qingdao, China, Aug. 13-17, 2012, Samsung, "UL DAI Field for DL CA in FDD" (2 pages).
R1-1701686: 3GPP TSG RAN WG1 Meeting #88, Athens, Greece, Feb. 13-17, 2017, Huawei, HiSilicon, "UL codebook design in NR," pp. 1-4.
R1-104280: 3GPP TSG RAN WG1 Meeting #62, Madrid, Spain, Aug. 23-27, 2010, Huawei, "A/N codebook design for carrier aggregation using DFT-S-OFDM," pp. 1-6.
R1-1707417: 3GPP TSG RAN WG1 Meeting #89, Hangzhou, China, May 15-19, 2017, Intel Corporation, "HARQ aspects for carrier aggregation," pp. 1-5.
R1-1707239: 3GPP TSG RAN WG1 Meeting #88bis, Hangzhou, China, May 15-19, 2017, Vivo, "NR transmission on anchor bandwidth part," pp. 1-3.
R1-1706903: 3GPP TSG RAN WG1 Meeting #89, Hangzhou, China, May 15-19, 2017, Huawei, HiSilicon, "On NR carrier aggregation," pp. 1-5.

\* cited by examiner

METHOD AND APPARATUS FOR TRANSMITTING AND RECEIVING WIRELESS SIGNAL IN WIRELESS COMMUNICATION SYSTEM

This application is a 35 USC § 371 National Stage entry of International Application No. PCT/KR2018/010573, filed on Sep. 10, 2018, which claims priority to U.S. Provisional Application No. 62/555,707, filed on Sep. 8, 2017, U.S. Provisional Application No. 62/577,779, filed on Oct. 27, 2017, U.S. Provisional Application No. 62/586,880, filed on Nov. 15, 2017, U.S. Provisional Application No. 62/616,466, filed on Jan. 12, 2018, U.S. Provisional Application No. 62/630,319, filed on Feb. 14, 2018, U.S. Provisional Application No. 62/656,927, filed on Apr. 12, 2018, U.S. Provisional Application No. 62/675,135, filed on May 22, 2018, U.S. Provisional Application No. 62/675,104, filed on May 22, 2018, U.S. Provisional Application No. 62/716,953, filed on Aug. 9, 2018, and Korean Patent Application No. 10-2018-0039471, filed on Apr. 5, 2018 all of which are incorporated by reference in their entirety herein.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

It will be appreciated by persons skilled in the art that the objects that could be achieved with the present invention are not limited to what has been particularly described hereinabove, and the above and other objects that the present disclosure could achieve will be more clearly understood from the following detailed description.

Technical Solution

In an aspect of the present invention, a method of performing communication by a user equipment (UE) in a wireless communication system includes receiving only one downlink signal in a set of slots; generating an acknowledgement/negative acknowledgement (A/N) codebook for the one or more downlink signals; and transmitting the A/N codebook. If a specific condition including the following 1) to 3) is satisfied, the A/N codebook includes only A/N information for the one downlink signal.

1) An A/N codebook configuration scheme is set as a semi-static A/N codebook,

2) The downlink signal is received in a primary cell (PCell), and

3) The downlink signal is scheduled by a first downlink control information (DCI) format, and a specific field of the first DCI format has a first value.

The first DCI format includes a DCI format with a field configuration maintained same, even though the A/N codebook configuration scheme is configured as a dynamic A/N codebook.

In another aspect of the present invention, a UE in a wireless communication system includes a radio frequency (RF) module; and a processor. The processor is configured to receive only one downlink signal in a set of slots, generate an acknowledgement/negative acknowledgement (A/N) codebook for the one or more downlink signals, and transmit the A/N codebook. If a specific condition including the following 1) to 3) is satisfied, the A/N codebook includes only A/N information for the one downlink signal, 1) An A/N codebook configuration scheme is set as a semi-static A/N codebook, 2) The downlink signal is received in a primary cell (PCell).

3) The downlink signal is scheduled by a first downlink control information (DCI) format, and a specific field of the first DCI format has a first value.

The first DCI format includes a DCI format with a field configuration maintained same, even though the A/N codebook configuration scheme is configured as a dynamic A/N codebook.

Preferably, if the A/N codebook configuration scheme is configured as the dynamic A/N codebook, the specific field of the first DCI format may include a 2-bit field used to indicate a counter-downlink assignment index (counter-DAI) value.

Preferably, the downlink signal may include (i) a physical downlink shared channel (PDSCH) or (ii) a physical downlink control channel (PDCCH) indicating semi-persistent scheduling (SPS) PDSCH release.

Preferably, if the downlink signal is scheduled by a second DCI format, the A/N codebook may include maximum A/N information based on the number of slots included in the slot set, the second DCI format may include a DCI format in which a DAI field is present or absent on the basis of the A/N codebook configuration scheme, and the slot set may include a plurality of slots.

Preferably, if the A/N codebook is transmitted on a physical uplink shared channel (PUSCH), the specific condition may further include the following 4).

4) The PUSCH is scheduled by uplink (UL) grant DCI including a 1-bit DAI field, and the 1-bit DAI field has a second value.

In another aspect of the present invention, a method of performing communication by a base station (BS) in a wireless communication system includes transmitting only one downlink signal in a set of slots, receiving an acknowledgement/negative acknowledgement (A/N) codebook for the one or more downlink signals, and processing the A/N codebook. If a specific condition including the following 1) to 3) is satisfied, the A/N codebook includes only A/N information for the one downlink signal.

1) An A/N codebook configuration scheme is set as a semi-static A/N codebook.

2) The downlink signal is received in a primary cell (PCell).

3) The downlink signal is scheduled by a first downlink control information (DCI) format, and a specific field of the first DCI format has a first value.

The first DCI format includes a DCI format with a field configuration maintained same, even though the A/N codebook configuration scheme is configured as a dynamic A/N codebook.

In another aspect of the present invention, a BS in a wireless communication system includes an RF module; and a processor. The processor is configured to transmit only one downlink signal in a set of slots, receive an acknowledgement/negative acknowledgement (A/N) codebook for the one or more downlink signals, and process the A/N codebook. If a specific condition including the following 1) to 3) is satisfied, the A/N codebook includes only A/N information for the one downlink signal.

1) An A/N codebook configuration scheme is set as a semi-static A/N codebook.

2) The downlink signal is received in a primary cell (PCell).

3) The downlink signal is scheduled by a first downlink control information (DCI) format, and a specific field of the first DCI format has a first value.

The first DCI format includes a DCI format with a field configuration maintained same, even though the A/N codebook configuration scheme is configured as a dynamic A/N codebook.

Preferably, if the A/N codebook configuration scheme is configured as the dynamic A/N codebook, the specific field of the first DCI format may include a 2-bit field used to indicate a counter-downlink assignment index (counter-DAI) value.

Preferably, the downlink signal may include (i) a physical downlink shared channel (PDSCH) or (ii) a physical downlink control channel (PDCCH) indicating semi-persistent scheduling (SPS) PDSCH release.

Preferably, if the downlink signal is scheduled by a second DCI format, the A/N codebook may include maximum A/N information based on the number of slots included in the slot set, the second DCI format may include a DCI format in which a DAI field is present or absent on the basis of the A/N codebook configuration scheme, and the slot set may include a plurality of slots.

Preferably, if the A/N codebook is transmitted on a physical uplink shared channel (PUSCH), the specific condition may further include the following 4).

4) The PUSCH is scheduled by uplink (UL) grant DCI including a 1-bit DAI field, and the 1-bit DAI field has a second value.

Advantageous Effects

According to the present invention, wireless signal transmission and reception can be efficiently performed in a wireless communication system.

It will be appreciated by persons skilled in the art that the effects that can be achieved with the present invention are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 illustrates a radio frame structure.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
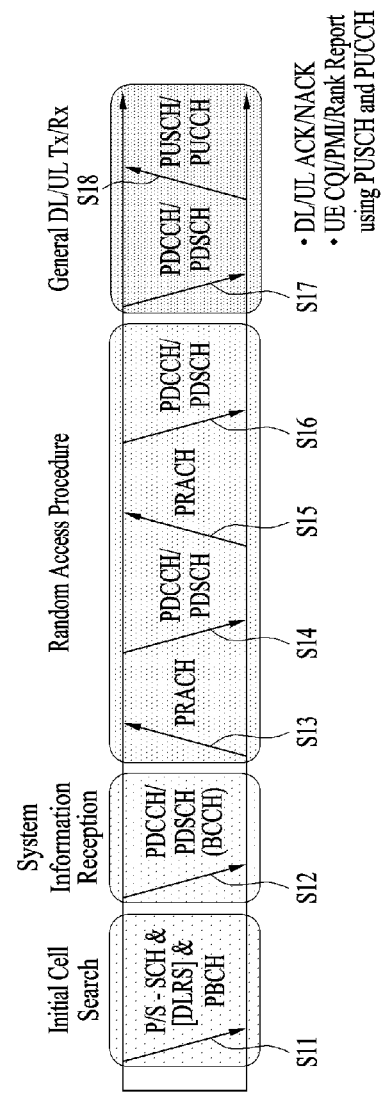
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be a periodically transmitted through a PUSCH according to request/command of a network.

Figure 2:
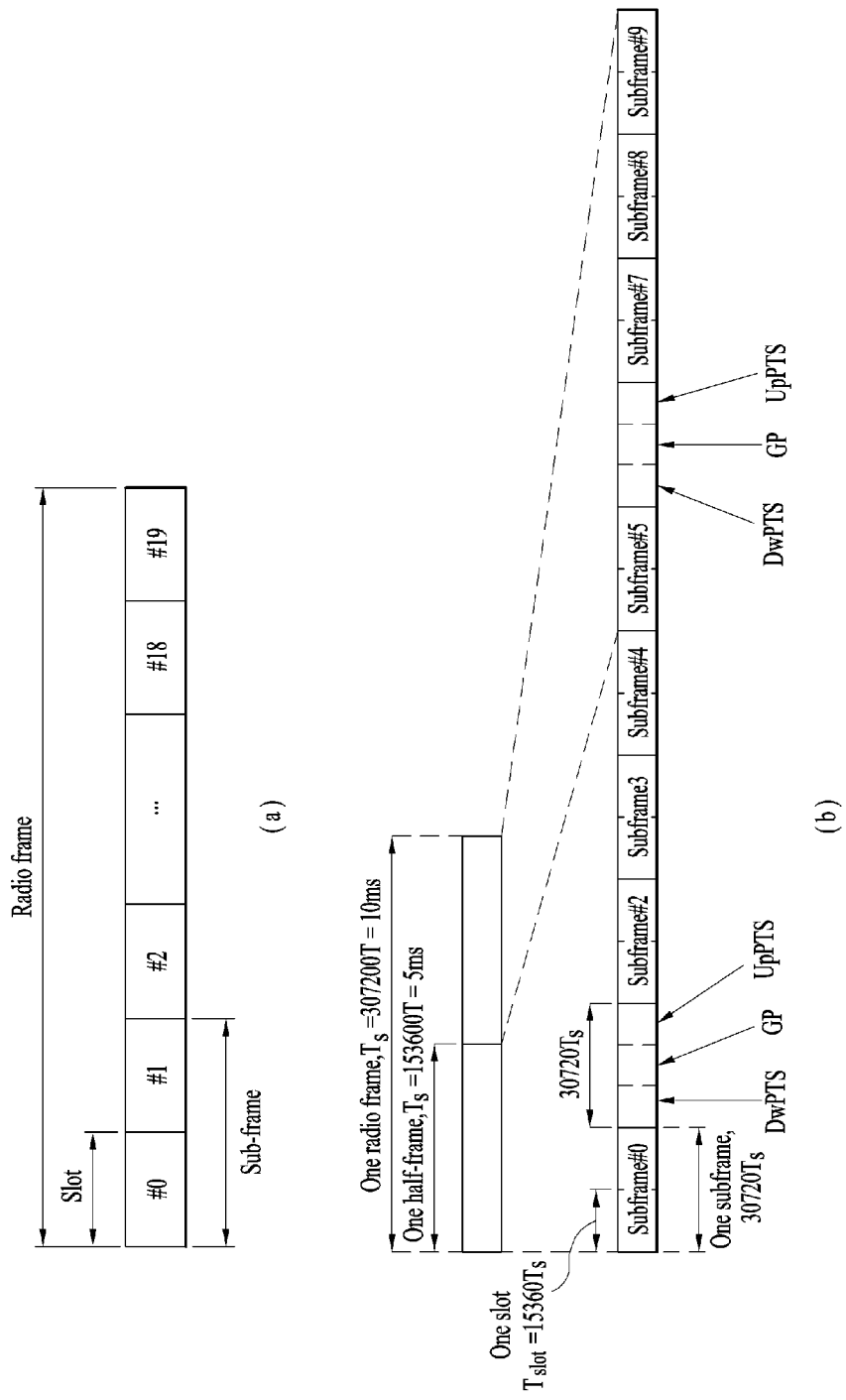

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can vary.

Figure 3:
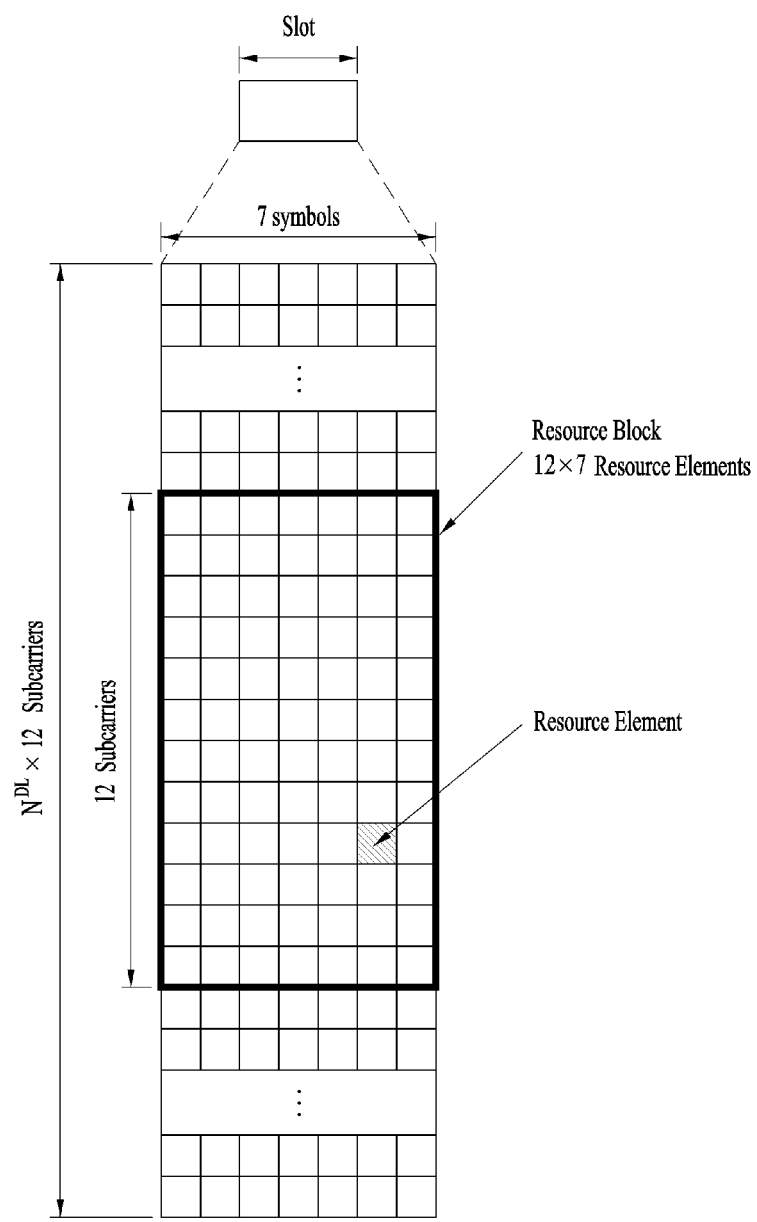
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
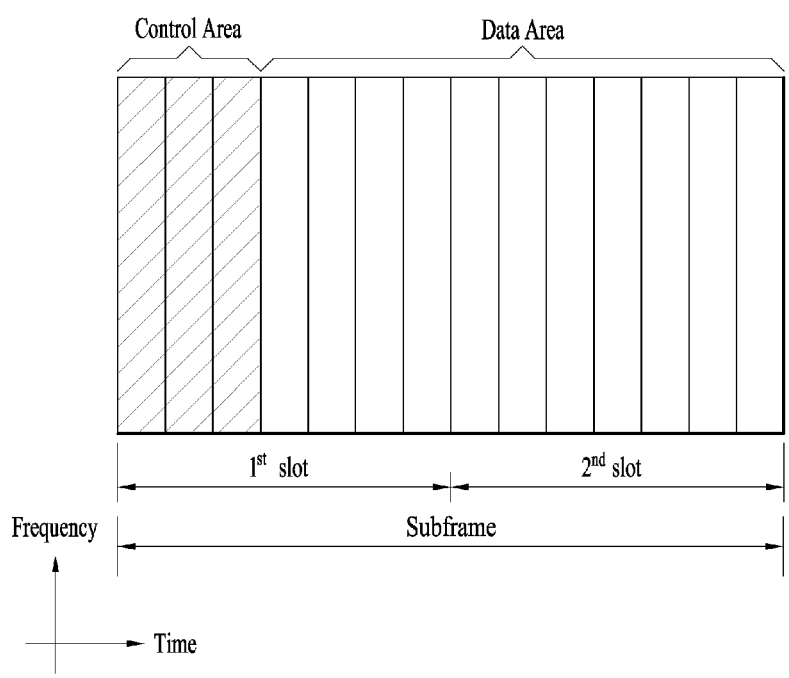
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates a structure of an uplink subframe used in LTE(-A).

Figure 5:
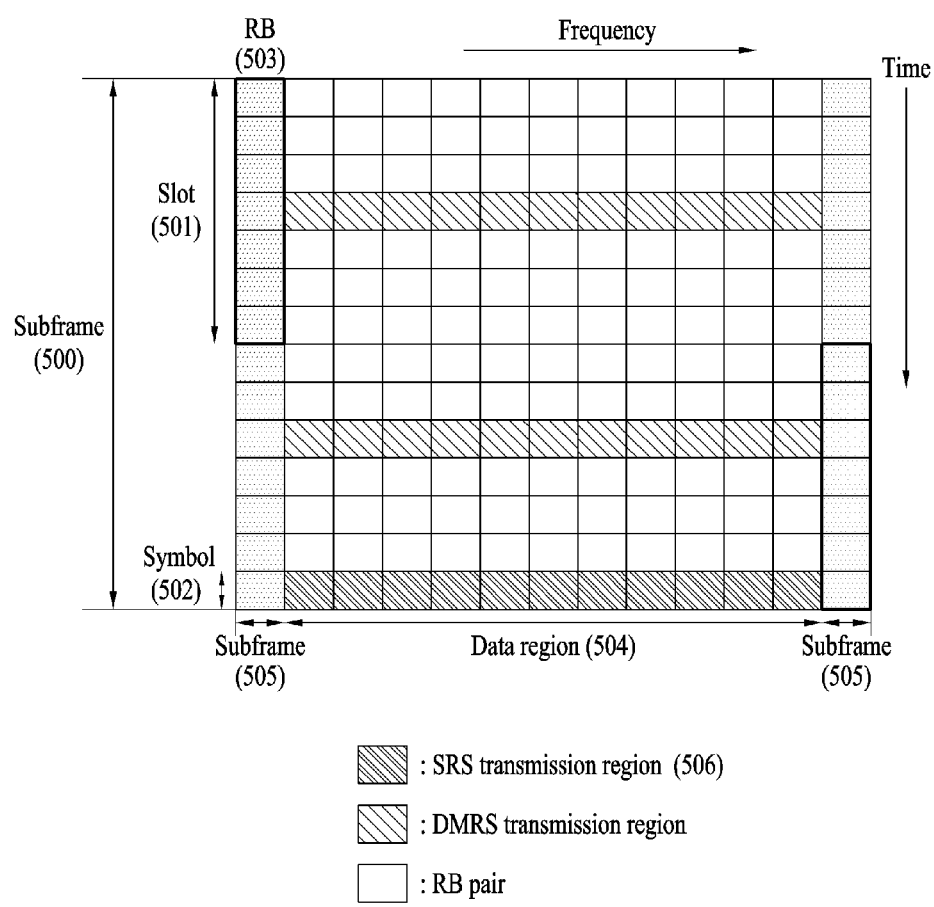
FIG. 5 illustrates the structure of an uplink subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or a periodically transmitted at the request of the eNB.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignement message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 6:
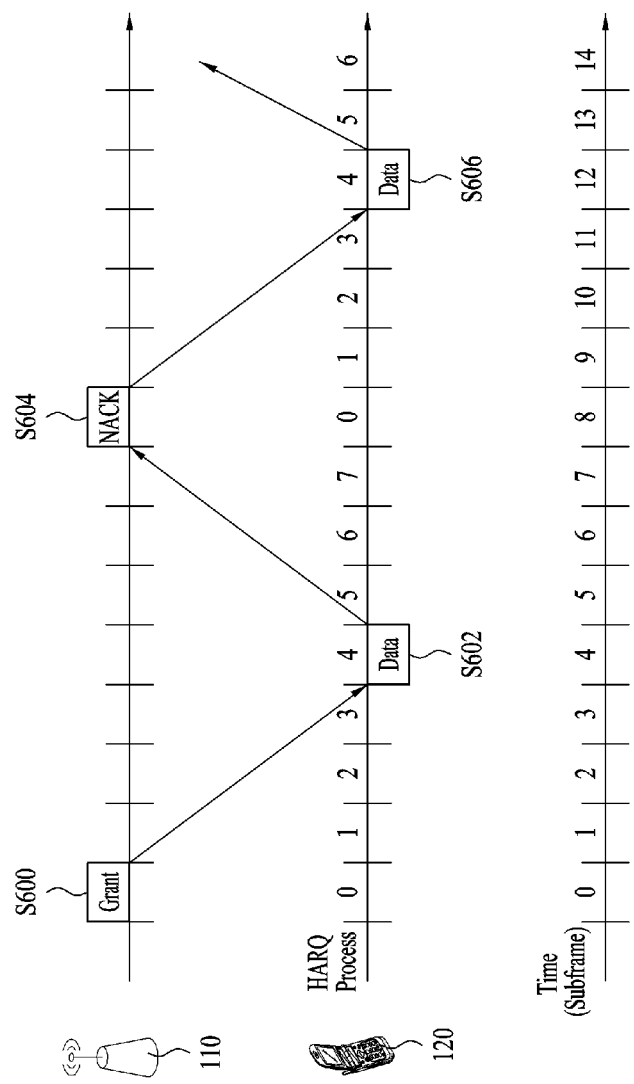
FIG. 6 illustrates UL HARQ (Uplink Hybrid Automatic Repeat reQuest) operation.

FIG. 6 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 6, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

Figure 7:
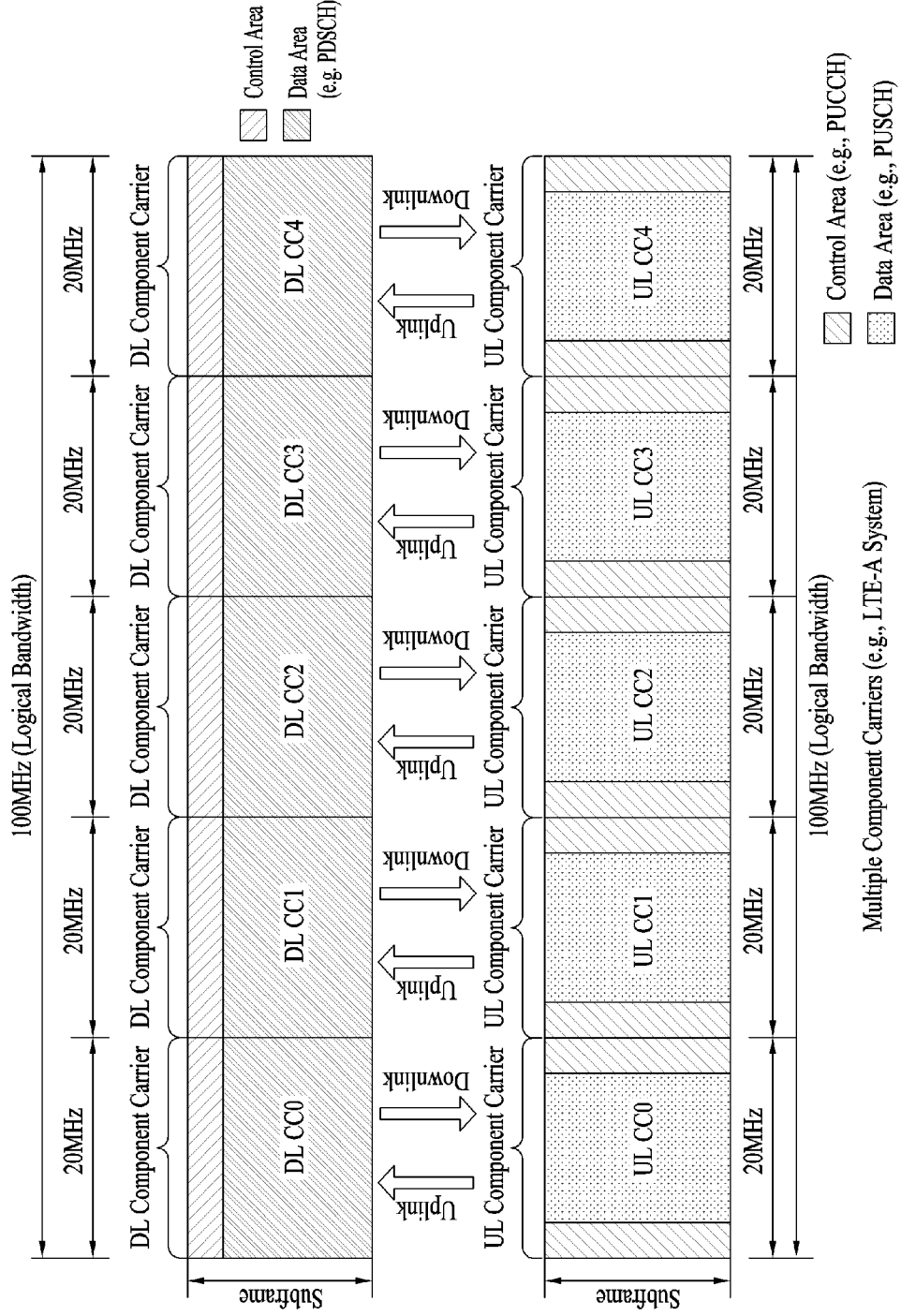
FIG. 7 illustrates a carrier aggregation (CA)-based wireless communication system.

FIG. 7 illustrates carrier aggregation (CA) communication system.

Referring to FIG. 7, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 8:
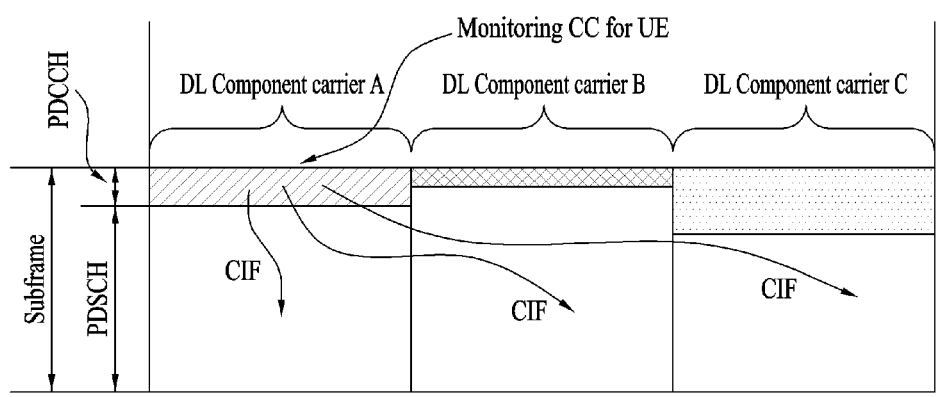
FIG. 8 illustrates cross-carrier scheduling.

FIG. 8 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 9:
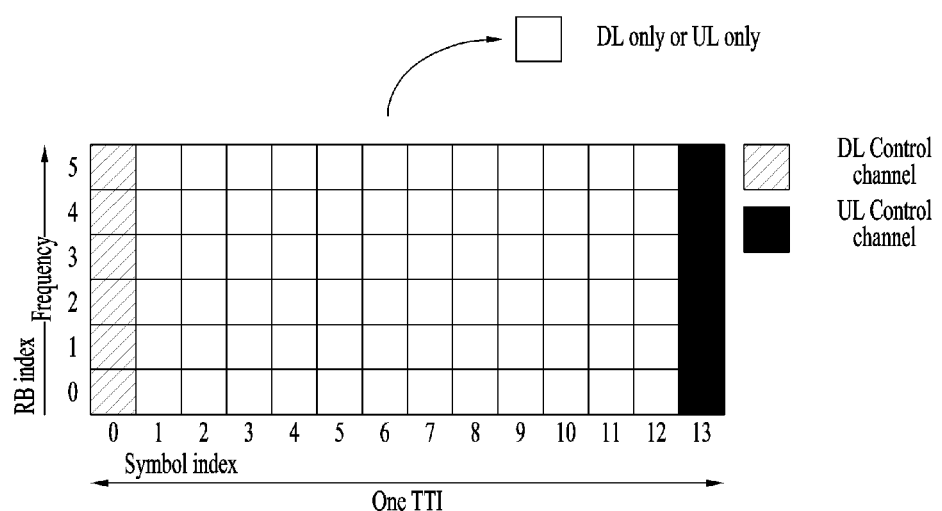
FIG. 9 illustrates a structure of a self-contained subframe.

In next-generation RAT (Radio Access Technology), a self-contained subframe is considered in order to minimize data transmission latency. FIG. 9 illustrates a self-contained subframe structure. In FIG. 9, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized As examples of self-contained subframe types which can be configured/set, the following four subframe types can be considered. Respective periods are arranged in a time sequence.

DL control period+DL data period+GP (Guard Period)+ UL control period
DL control period+DL data period
DL control period+GP+UL data period+UL control period
DL control period+GP+UL data period A PDFICH, a PHICH and a PDSCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Example: A/N Feedback

In the 3GPP NR system environment, OFDM parameters such as subcarrier spacing (SCS) and duration of OFDM symbol (OS) based thereon may be configured differently among a plurality of cells aggregated to one UE. Thus, the (absolute time) interval of a time resource (e.g., SF, slot or TTI) (for convenience, referred to as TU (Time Unit)) composed of the same number of symbols can be configured differently between aggregated cells. Here, the symbol may include an OFDM symbol, an SC-FDMA symbol.

Figure 10:
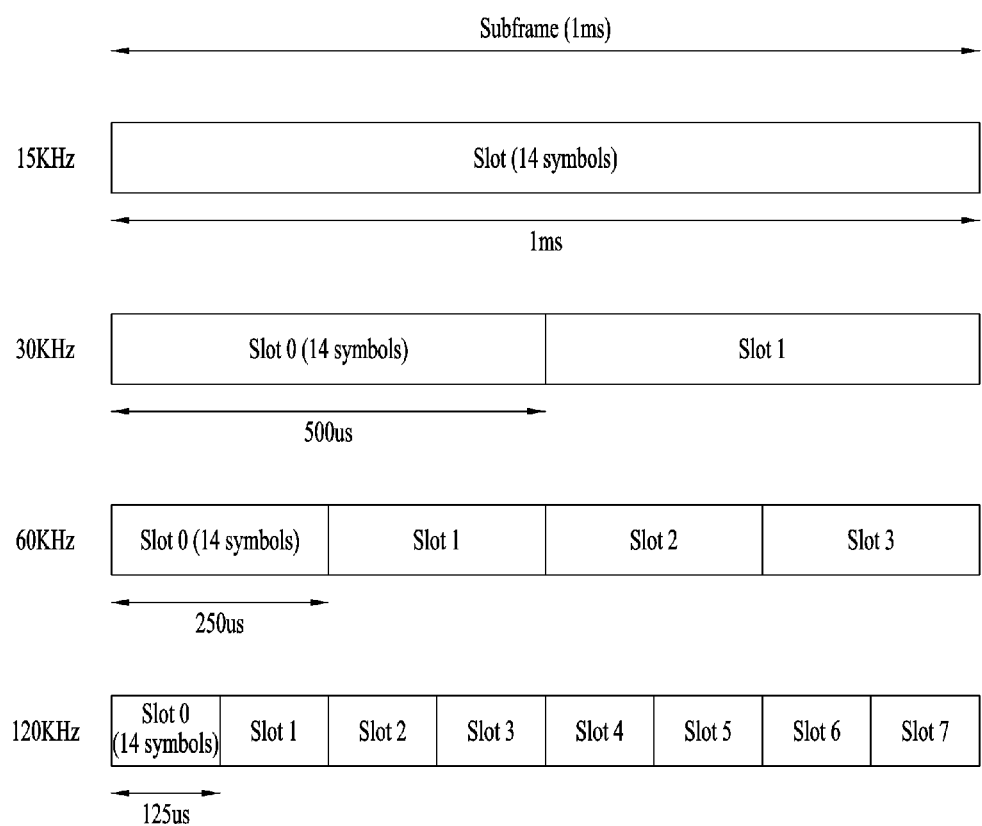
FIG. 10 illustrates an exemplary frame structure as defined in $3^{rd}$ generation partnership project new RAT (3GPP NR).

FIG. 10 illustrates a frame structure defined in 3GPP NR. Like the radio frame structure of LTE/LTE-A (see FIG. 2), one radio frame in 3GPP NR consists of 10 subframes, and each subframe has a length of 1 ms. One subframe includes one or more slots and the slot length depends on the SCS. 3GPP NR supports SCSs of 15 KHz, 30 KHz, 60 KHz, 120 KHz and 240 KHz. Here, the slot corresponds to the TTI of FIG. 9.

Table 4 illustrates that the number of symbols per slot, the number of slots per frame, and the number of slots per subframe are different according to SCS.

[표 4]

| SCS ($15*2^u$) | The number of symbols in a slot | The number of slots in a frame | The number of slots in a subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

In the legacy LTE system, a hybrid automatic repeat request (HARQ)-acknowledgement (ACK) (i.e., A/N feedback transmission timing for reception of DL data in one DL subframe (within one CC), that is, the delay (i.e., An/N delay) between the reception time of DL data and the transmission time of an A/N for the DL data may be predefined as a fixed value or configured semi-statically by RRC signaling. Meanwhile, if CA of a plurality of CCs is configured for a UE, PUCCH resources for A/N transmission corresponding to reception of a plurality of DL data in the plurality of CCs may be allocated in a scheme of indicating one PUCCH resource of a PUCCH set including a plurality of candidate PUCCH resources, which is preconfigured by RRC signaling, by a specific field of DCI (e.g., a DL grant) (i.e., by means of an ACK/NACK resource indicator (ARI)). The candidate PUCCH resources of the PUCCCH set (or ARI values/states corresponding to/mapped to the respective candidate PUCCH resources) may be configured equally for all of the CCs aggregated for the UE.

Meanwhile, the introduction of the following features is under consideration for the NR system in order to support various operating frequency bands and use resources flexibly and efficiently.

1) Direct dynamic indication is supported.

A. For example, with an A/N delay set including a plurality of candidate A/N delay values preconfigured by RRC signaling, one value of the A/N delay set may be indicated by information/a value (e.g., an ACK/NACK delay indicator (ADI)) of a specific field in DCI (e.g., a DL grant).

2) All of long PUCCH types/formats (e.g., PUCCH format 1/3/4) each including a predetermined number of or more symbols (e.g., four or more symbols) and short PUCCH types/formats (e.g., PUCCH format 0/2) each including fewer symbols than the predetermined number (e.g., one or two symbols) are supported in consideration of a different UL coverage level and/or a different UCI payload size for each UE.

A. Transmission of a long PUCCH and a short PUCCH in time division multiplexing (TDM) in the same one slot and/or transmission of a plurality of short PUCCHs in TDM in the same one slot may be supported.

B. Table 5 illustrates an exemplary relationship between PUCCH formats and UCI.

PUCCH resources may refer to PUCCH resources based on different PUCCH formats (e.g., PUCCH formats having different structures of mapping UCI and DMRSs to REs/symbols), or different PUCCH resources in the same PUCCH format (e.g., PUCCH resources to which different values of at least one of frequency (e.g., physical resource block (PRB) index), time (e.g., symbol index), code (e.g., cyclic shift (CS) orthogonal cover code (OCC) sequence) are allocated).

[1] Method 1: Different ARI PUCCH Resource Sets are Configured for Different CCs (CC Groups).

In this method, resources included in an ARI PUCCH resource set (e.g., PUCCH resources corresponding to/mapped to respective ARI values) are configured individually/independently (e.g., differently) for each CC (CC group). For example, some specific resources of an ARI PUCCH resource set (e.g., PUCCH resources corresponding to/mapped to some specific ARI values) may be configured equally for all CCs (these ARIs are defined as "common-ARIs"), whereas the remaining resources (e.g., PUCCH resources corresponding to/mapped to the remaining ARI values) may be configured differently for different CCs (or CC groups) (these ARIs are defined as "separate-ARIs"). In another method, it is also possible to configure all resources of an ARI PUCCH resource set completely differently (e.g., only by separate-ARIs) for each CC (CC group), that is, to configure the resources of an ARI PUCCH resource set to be completely different between CCs (CC groups). In another method, a different number of PUCCH resources may be configured in the ARI PUCCH resource set for each CC (or CC group). In this case, specific resources may be configured commonly for all CCs (e.g., by common-ARIs), whereas the remaining resources may be configured specifically to certain CCs (CC groups) (e.g., by separate-ARIs).

One CC group may include one or more CCs. Further, all CCs may be configured to belong to the same one CC group (hereinafter, referred to as CA group). One CC may be configured (1) to belong to one CC group only, or 2) to redundantly belong to a plurality of CC groups (except for a CA group). Further, one CC group may include contiguous CCs in terms of CC indexes.

TABLE 5

| Format | PUCCH length in OFDM symbols | Number of bits | UCI | Etc. |
| --- | --- | --- | --- | --- |
| 0 | 1-2 | =2 | HARQ, SR | Sequence selection |
| 1 | 4-14 | =2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [=N] | HARQ, CSI, [SR] | DFT-s-OFDM (Pre DFT OCC) |

3) Configuration of different SCSs and/or different TTI lengths for the respective CCs of CA configured for one UE is supported.

The present invention proposes a method of efficiently allocating PUCCH resources for an HARQ-ACK feedback corresponding to reception of a plurality of DL data in a plurality of CCs, and transmitting the HARQ-ACK feedback, in the case where CA is configured between a plurality of CCs (and/or an A/N transmission delay is indicated dynamically) in an NR system. Hereinbelow, different Therefore, (the size of) A/N payload transmitted in a specific PUCCH resource may include A/Ns for all CCs (e.g., if the PUCCH resource corresponds to a common-ARI) or an A/N for a specific CC group (if the PUCCH resource corresponds to a separate-ARI) according to a CC combination (the number of CCs) for which the PUCCH resource is configured by an ARI.

In the above, PUCCH resources corresponding to separate-ARIs may be allocated such that the PUCCH resources are multiplexed between different CC groups only in TDM.

For example, the PUCCH resources corresponding to the separate-ARIs may be allocated such that (i) a plurality of long PUCCHs, (ii) a long PUCCH and a short PUCCH, or (iii) a plurality of PUCCHs are configured only in different symbols. Or the PUCCH resources corresponding to the separate-ARIs may be allocated such that the PUCCH resources corresponding to the separate-ARIs are multiplexed in TDM, FDM (e.g., configured in different PRBs), or CDM (e.g., using different CSs/OCCs) between different CC groups. If the PUCCH resources corresponding to the separate-ARIs are multiplexed in TDM, all of A/Ns corresponding to a plurality of different CC groups may be transmitted in a plurality of different PUCCH resources in the same one slot, whereas if the PUCCH resources corresponding to the separate-ARIs are multiplexed in FDM/CDM, only an A/N corresponding to one CC group (from among a plurality of CC groups) may be transmitted in one PUCCH resource in one slot.

Further, PUCCH resources configured on a CC group basis may have a different PUCCH format, and/or a different number of PRBs and/or symbols included in a PUCCH according to the number of CCs in a corresponding CC group. For example, as more CCs belong to a CC group, PUCCH resources based on a PUCCH format supporting larger UCI payload (e.g., a long PUCCH), more PRBs, and more symbols may be configured for the CC group. On the contrary, as fewer CCs belong to a CC group, PUCCH resources based on a PUCCH format supporting smaller UCI payload (e.g., a short PUCCH), fewer PRBs, and fewer symbols may be configured for the CC group. Further, the symbol position of PUCCH resources configured on a CC group basis may be configured to vary according to the number of CCs belonging to a corresponding CC group. For example, if a CC group includes more CCs, a PUCCH format/resources (e.g., a long PUCCH) configured in a symbol with a lower index (in a slot) may be configured for the CC group. On the contrary, if a CC group includes fewer CCs, a PUCCH format/resources (e.g., a short PUCCH) configured in a symbol with a higher index (in a slot) may be configured for the CC group.

Meanwhile, in regard to an ARI indicating a PUCCH resource in the same slot, 1) only a common-ARI may be signaled for all CCs, or 2) only a separate-ARI may be signaled for each CC group. In the case of 1), for example, a common-ARI may be signaled by every DL-grant DCI that schedules any CC. In the case of 2), a separate-ARI may be signaled by DL-grant DCI that schedules a CC(s) of each CC group.

In an example of the proposed method, if CA is configured for a total of four CCs, CC1 to CC4, a PUCCH resource set corresponding to a total of four ARI values, A1 to A4 is configured, and a total of eight PUCCH resources, P1 to P8 are assumed, the following PUCCH set configuration may be available.

1) PUCCH set configured for CC1: {A1, A2, A3, A4}={P1, P2, P3, P5}
2) PUCCH set configured for CC2: {A1, A2, A3, A4}={P1, P2, P3, P6}
3) PUCCH set configured for CC3: {A1, A2, A3, A4}={P1, P2, P4, P7}
4) PUCCH set configured for CC4: {A1, A2, A3, A4}={P1, P2, P4, P8}

According to the example, (the size of) A/N payload transmitted in P1 or P2 may include A/Ns corresponding to a CC combination (the number of CCs) for which P1/P2 is configured by an ARI (A1 or A2), that is, all CCs {CC1, CC2, CC3, CC4}. Further, (the size of) A/N payload transmitted in P3 or P4 may include A/Ns corresponding to a CC combination (the number of CCs) for which P3/P4 is configured by an ARI (A3), that is, a specific CC group {CC1, CC2} or {CC3, CC4}. Further, (the size of) A/N payload transmitted in P5/P6/P7/P8 may include an A/N corresponding to a CC for which each corresponding PUCCH resource is configured by an ARI (A4), that is, {CC1}, {CC2}, {CC3}, or {CC4}. Herein, an A/N corresponding to CCx may mean an A/N for a DL signal (e.g., data) received in CCx.

Additionally, consideration may be given to a situation in which for the purpose of configuring dynamic A/N payload (codebook), a counter-downlink assignment index (counter-DAI) (and/or total-DAI) is signaled by DL-grant DCI to indicate the (CC index-based) scheduling number of DL data transmitted in a specific CC (and/or the number of DL data that have been scheduled (until the current slot)). In this case, if a common-ARI is indicated by DCI, a DAI value may be determined/signaled for all CCs, whereas if a separate-ARI is indicated by the DCI, a DAI value may be determined/signaled only for CCs belonging to a corresponding CC group, on a CC group basis.

The proposed method may be considered to be a scheme of individually/independently (e.g. differently) configuring a CC group corresponding to each resource of an ARI PUCCH resource set (e.g., whether each resource corresponds to all CCs or only a specific CC(s)).

[2] Method 2: Different ARI PUCCH Resource Sets are Configured for Different A/N Delays.

In this method, resources included in an ARI PUCCH resource set (e.g., PUCCH resources corresponding to/mapped to respective ARI values) are configured individually/independently (e.g., differently) for each A/N delay (A/N delay group). For example, some specific resources of an ARI PUCCH resource set (e.g., PUCCH resources corresponding to/mapped to some specific ARI values) may be configured equally for all A/N delays (i.e., DDs) (these ARIs are defined as "common-ARIs"), whereas the remaining resources (e.g., PUCCH resources corresponding to/mapped to the remaining ARI values) may be configured differently for different DDs (or DD groups) (these ARIs are defined as "separate-ARIs"). In another method, it is also possible to configure all resources of an ARI PUCCH resource set completely differently for each DD (DD group).

One DD group may include one or more DDs. Further, all DDs may be configured to belong to the same one DD group (hereinafter, referred to as DA group). One DD may be configured (1) to belong to one DD group only, or 2) to redundantly belong to a plurality of DD groups (except for a DA group). Further, when (the DDs of the A/N delay set) are indexes in the order of delay values, one DD group may include contiguous DDs in terms of DD indexes.

Therefore, (the size of) A/N payload transmitted in a specific PUCCH resource may include A/Ns for all DDs (e.g., if the PUCCH resource corresponds to a common-ARI) or an A/N for a specific DD group (if the PUCCH resource corresponds to a separate-ARI) according to a DD combination (the number of DDs) for which the PUCCH resource is configured by an ARI.

In the above, PUCCH resources corresponding to separate-ARIs may be allocated such that the PUCCH resources are multiplexed between different DD groups only in TDM (e.g., such that a plurality of long PUCCHs, a long PUCCH and a short PUCCH, or a plurality of PUCCs are configured only in different symbols). For example, the PUCCH resources corresponding to the separate-ARIs may be allocated such that (i) a plurality of long PUCCHs, (ii) a long PUCCH and a short PUCCH, or (iii) a plurality of PUCCHs are configured only in different symbols. Or the PUCCH resources corresponding to the separate-ARIs may be allocated such that the PUCCH resources corresponding to the separate-ARIs are multiplexed in TDM, FDM (e.g., configured in different PRBs), or CDM (e.g., using different CSs/OCCs). If the PUCCH resources corresponding to the separate-ARIs are multiplexed in TDM, all of A/Ns corresponding to a plurality of different DD groups may be transmitted in a plurality of different PUCCH resources in the same one slot, whereas if the PUCCH resources corresponding to the separate-ARIs are multiplexed in FDM/CDM, only an A/N corresponding to one DD group (from among a plurality of DD groups) may be transmitted in one PUCCH resource in one slot.

Further, PUCCH resources configured on a DD group basis may have a different PUCCH format, and/or a different number of PRBs and/or symbols included in a PUCCH according to the number of DDs (and/or each delay value) in a corresponding DD group. For example, as more DDs belong to a DD group (and/or each delay value of the DD group is larger), PUCCH resources based on a PUCCH format supporting larger UCI payload (e.g., a long PUCCH), more PRBs, and more symbols may be configured for the DD group. On the contrary, as fewer DDs belong to a DD group (and/or each delay value of the DD group is smaller), PUCCH resources based on a PUCCH format supporting smaller UCI payload (e.g., a short PUCCH), fewer PRBs, and fewer symbols may be configured for the DD group. Further, the symbol position of PUCCH resources configured on a DD group basis may be configured to vary according to A/N delay values (and/or the number of DDs) belonging to a corresponding DD group. For example, if a DD group includes larger A/N delay values (and/or more DDs), a PUCCH format/resources (e.g., a long PUCCH) configured in a symbol with a lower index (in a slot) may be configured for the DD group. On the contrary, if a DD group includes smaller A/N delay values (and/or fewer DDs), a PUCCH format/resources (e.g., a short PUCCH) configured in a symbol with a higher index (in a slot) may be configured for the DD group.

Meanwhile, in regard to an ARI indicating a PUCCH resource in the same slot, 1) only a common-ARI may be signaled for all DDs, or 2) only a separate-ARI may be signaled for each DD group. In the case of 1), for example, only a common-ARI may be signaled by every DL-grant DCI that indicates any DD as an A/N delay for DL data. In the case of 2), only a separate-ARI may be signaled by DL-grant DCI that indicates a DD(s) of each DD group as an A/N delay for DL data.

In an example of the proposed method, if an A/N delay set is configured to include a total of four DDs, DD1 to DD4, a PUCCH resource set corresponding to a total of four ARI values, A1 to A4 is configured, and a total of five PUCCH resources, P1 to P5 are assumed, the following PUCCH set configuration may be available.

1) PUCCH set configured for DD1: {A1, A2, A3, A4}={P1, P2, P3, P4}
2) PUCCH set configured for DD2: {A1, A2, A3, A4}={P1, P2, P3, P4}
3) PUCCH set configured for DD3: {A1, A2, A3, A4}={P1, P2, P3, P5}
4) PUCCH set configured for DD4: {A1, A2, A3, A4}={P1, P2, P3, P5}

According to the example, (the size of) A/N payload transmitted in P1, P2, or P3 may include A/Ns (for DL data received in slots) corresponding to a DD combination (the number of DDs) for which P1/P2/P3 is configured by an ARI (A1, A2 or A3), that is, all DDs {DD1, DD2, DD3, DD4}. Further, (the size of) A/N payload transmitted in P4 or P5 may include A/Ns corresponding to a DD combination (the number of DDs) for which P4/P5 is configured by an ARI (A4), that is, a specific DD group {DD1, DD2} or {DD3, DD4}. Herein, an A/N corresponding to DDx may mean an A/N for a DL signal (e.g., data) received in a slot corresponding to DDx.

Additionally, consideration may be given to a situation in which for the purpose of configuring dynamic A/N payload (codebook), a counter-DAI (and/or total-DAI) is signaled by DL-grant DCI to indicate the (DD/slot index-based) scheduling number of DL data transmitted in a slot corresponding to a specific DD (and/or the number of DL data that have been scheduled (until the current slot)). If a common-ARI may be indicated by DCI, a DAI value is determined/signaled for all DDs, whereas if a separate-ARI is indicated by the DCI, a DAI value may be determined/signaled only for DDs belonging to a corresponding DD group, on a DD group basis.

The proposed method may be considered to be a scheme of individually/independently (e.g. differently) configuring a DD group corresponding to each resource of an ARI PUCCH resource set (e.g., whether each resource corresponds to all DDs or only a specific DD(s)).

Method 1 and Method 2 may be applied in combination. For example, the resources of an ARI PUCCH resource set (e.g., a PUCCH resource corresponding to/mapped to each ARI value) may be configured individually/independently (e.g., differently) for each DD (DD group) configured for each CC (CC group). In another method, a combination of a CC group and a DD group corresponding to each of the resources of an ARI PUCCH resource set may be configured individually/independently (e.g., differently).

[3] Method 3: A Maximum UCI Code Rate/Payload Size is Configured for Each PUCCH Resource/Format.

To fulfill latency and coverage requirements in the NR system, support of the following various PUCCH formats is considered.

1) PUCCH format S0 (short 0) (see format 0 in Table 5)
  A. Supported UCI payload size: up to K bits (e.g., K=2)
  B. The number of OFDM symbols in a single PUCCH: from 1 to X symbols (e.g., X=2)
  C. Transmission structure: only a UCI signal without any DMRS is included, and one of a plurality of specific sequences is selected/transmitted. Thus, a specific UCI state is transmitted.

2) PUCCH format S1 (short 1) (see format 2 in Table 5)
  A. Supported UCI payload size: more than K bits (e.g., K=2)
  B. The number of OFDM symbols in a single PUCCH: from 1 to X symbols (e.g., X=2)
  C. Transmission structure: DMRS and UCI are configured/mapped in FDM in the same symbol, and encoded UCI bits are transmitted by applying only inverse fast Fourier transform (IFFT), not discrete Fourier transform (DFT).

3) PUCCH format L0 (long 0) (see format 1 in Table 5)
  A. Supported UCI payload size: up to K bits (e.g., K=2)
  B. The number of OFDM symbols in a single PUCCH: from 1 to Z symbols (e.g., Y=4, Z=14)
  C. Transmission structure: DMRS and UCI are configured/mapped in TDM in different symbols, the UCI is obtained by multiplying a specific sequence by modulation symbols (e.g., QPSK symbols), and a CS/OCC is applied to both of the UCI and the DMRS. Thus, it is possible to support multiplexing of a plurality of UEs (in the same RB).

4) PUCCH format L1 (long 1) (see format 4 in Table 5)
   A. Supported UCI payload size: more than K bits (e.g., K=2)
   B. The number of OFDM symbols in a single PUCCH: from Y to Z symbols (e.g., Y=4, Z=14)
   C. Transmission structure: DMRS and UCI are configured/mapped in TDM in different symbols, and encoded UCI bits are transmitted by applying DFT. As an OCC is applied to the UCI and a CS (or interleaved frequency division multiplexing (IFDM) mapping) is applied to the DMRS, at the front end of DFT, it is possible to support multiplexing of a plurality of UEs.

5) PUCCH format L2 (long 2) (see format 3 in Table 5)
   A. Supported UCI payload size: more than K bits (e.g., K=2)
   B. The number of OFDM symbols in a single PUCCH: from Y to Z symbols (e.g., Y=4, Z=14)
   C. Transmission structure: DMRS and UCI are configured/mapped in TDM in different symbols, and DFT is applied to encoded UCI bits. Thus, transmission may be performed without multiplexing UEs.

On the basis of the above PUCCH formats, 1) a supported maximum UCI payload size, a supported UCI payload size range, or a maximum UCI code rate may be (UE-specifically) configured for each combination of one or more PUCCH formats. And/or 2) an ARI PUCCH resource set may be set/configured for each PUCCH format combination (or according to a UCI payload size or a maximum UCI code rate configured for the corresponding combination). For example, the following PUCCH format combinations may be considered.

1) Case 1: four combinations
   A. {S0, L0}, {S1}, {L1}, {L2}
2) Case 2: three combinations
   A. {S0, L0}, {S1, L1}, {L2}
3) Case 3: three combinations
   A. {S0, L0}, {S1}, {L1, L2}

Meanwhile, for the purpose of UL resource flexibility, it may be considered in the NR system that both of frequency hopping (FH)-enabled PUCCH resources and FH-disabled PUCCH resources are configured for one UE. In this case, the performance gains (e.g., coding and diversity gains) of the FH-enabled PUCCH and the FH-disabled PUCCH may be different. In this regard, supported maximum UCI code rates (or supported maximum UCI payload sizes) may be configured individually for the FH-enabled PUCCH and the FH-disabled PUCCH (in the same PUCCH format). Additionally, ARI PUCCH resource sets may be configured individually for the FH-enabled PUCCH and the FH-disabled PUCCH (in the same PUCCH format).

[4] Method 4: PUCCH Resources are Allocated in Consideration of Operating Bandwidth Part (BWP) Switching in a CC.

For the purpose of UE power saving and operating frequency flexibility in the NR system, a plurality of BWPs may be configured in one CC semi-statically by higher-layer signaling such as RRC signaling or the like (which is performed on a CC basis). A BWP may include contiguous frequency resources (e.g., a plurality of contiguous RBs), and each BWP may have a different SCS or TU. In this state, it may be considered to dynamically activate one of the plurality of BWPs by L1 signaling such as DCI, a medium access control (MAC) control element (CE), or the like. Therefore, a UE may perform a DL/UL signal/channel transmission and reception operation in the active BWP. Herein, the bandwidth (BW) of a BWP may be smaller than or equal to the total BW of a corresponding CC.

Meanwhile, even for a CC indicated for performing a UCI PUCCH transmission (referred to as a PCC) (in a situation of CA between a plurality of CCs), the operation of performing a UCI PUCCH transmission on the basis of dynamic switching between a plurality of BWPs configured in the PCC may have to be supported. In this regard, disagreement may occur between a UE and an eNB regarding a BWP to carry a PUCCH due to the UE's failure in detecting DL scheduling grant DCI transmitted by the eNB or the like, thereby causing the degradation of UCI transmission performance and inefficient use of system resources.

Now, the following PUCCH resource allocation method is proposed in consideration of dynamic BWP switching in a PCC. Basically, a scheme of indicating a BWP (index) (within a PCC) in which a PUCCH transmission will be performed by DL grant DCI that schedules any CC (i.e., covering both of (i) the PCC and (ii) a general CC other than the PCC) is considered. In this case, it may be regulated that PUCCH transmission BWPs (BWP indexes) indicated by a plurality of pieces of DL grant DCI (that schedule a plurality of CCs/slots) corresponding to the same single PUCCH transmission are identical across all of the plurality of pieces of DL grant DCI. Accordingly, the UE may operate on the assumption that all of the corresponding pieces of DL grant DCI indicate the same PUCCH transmission BWP (index). Specifically, the following methods may be considered.

1) Method 1
   A. A BWP (index) (in a PCC) in which a PUCCH transmission will be performed may be indicated by DL grant DCI.
   B. Basically, one or more ARI PUCCH resource sets may be configured for each BWP (in the PCC). Which ARI set or which PUCCH resource is to be used for UCI transmission may be indicated by a field other than a field used for indicating the BWP.
   C. It may be regulated that PUCCH transmission BWPs (BWP indexes) indicated by a plurality of pieces of DL grant DCI (scheduling a plurality of CCs/slots) corresponding to the same one PUCCH transmission are identical in all the pieces of DL grant DCI. For example, the UE may operate assuming that all the pieces of DL grant DCI indicate the same PUCCH transmission BWP (index).

2) Method 2
   A. For each ARI PUCCH resource set or each PUCCH resource of an ARI set, a BWP (index) (in the PCC) in which the PUCCH set or the PUCCH resource is configured/allocated may be configured.
   B. DL grant DCI may indicate only an ARI set or a PUCCH resource to be used for UCI transmission. A PUCCH transmission BWP may be determined just by the DL grant DCI.
   C. It may be regulated that BWPs (BWP indexes) in which a PUCCH resource is configured/allocated, indicated by a plurality of pieces of DL grant DCI (scheduling a plurality of CCs/slots) corresponding to the same one PUCCH transmission are identical in all the pieces of DL grant DCI. For example, the UE may operate, assuming that all the pieces of DL grant DCI indicate the same PUCCH resource and BWP (index).

[5] Method 5: A/N Fallback Operation in the Case of Configuring Semi-Static HARQ-ACK Codebook.

When a semi-static A/N codebook is configured in the NR system, (the size of) (maximum) A/N payload transmitted on one PUCCH in one slot may be determined by the number of A/N bits corresponding to a combination (hereinafter, referred to as a bundling window) of all CCs configured for the UE and all DL scheduling slots (or PDSCH transmission slots or PDCCH monitoring slots) for which an A/N transmission timing may be indicated. That is, the semi-static A/N codebook scheme fixes the size of an A/N codebook (to a maximum value) irrespective of the number of actually scheduled DL data. For example, DL grant DCI (a PDCCH) may carry PDSCH-to-A/N timing information, and the PDSCH-to-A/N timing information may have one (e.g., k) of a plurality of values. For example, if a PDSCH is received in slot #m, and PDSCH-to-A/N timing information in DL grant DCI (a PDCCH) that schedules the PDSCH indicates k, A/N information for the PDSCH may be transmitted in slot #(m+k). For example, it may be given that k∈{1, 2, 3, 4, 5, 6, 7, 8}. Meanwhile, if the A/N information is transmitted in slot #n, the A/N information may include a maximum number of A/Ns with respect to a bundling window. That is, the A/N information in slot #n may include an A/N corresponding to slot #(n−k). For example, if k∈{1, 2, 3, 4, 5, 6, 7, 8}, the A/N information in slot #n includes A/Ns corresponding to slot #(n−8) to slot #(n−1) (i.e., a maximum number of A/Ns) irrespective of actual DL data reception. Herein, A/N information may be replaced with an A/N codebook or A/N payload. Further, a slot may be understood as/replaced with a candidate occasion for DL data reception. As described in the above example, a bundling window is determined on the basis of a PDSCH-to-A/N timing with respect to an A/N slot, and a PDSCH-to-A/N timing set may have predefined values (e.g., {1, 2, 3, 4, 5, 6, 7, 8}) or may be configured by higher-layer signaling (RRC signaling).

However, if a semi-static A/N codebook is configured as the A/N codebook configuration method, the operation of always transmitting A/N payload of a maximum size irrespective of the number of actually scheduled DL data as described above may be inefficient at least in terms of PUCCH resource utilization.

In this regard, the following (PUCCH)/A/N fallback operation may be considered in a semi-static A/N codebook configuration situation. Hereinbelow, a PDSCH/PDCCH (e.g., indicating SPS (PDSCH) release) may be (i) a PDSCH or (or, and/or) (ii) a PDCCH indicating SPS (PDSCH) release, and may be generalized as DL data or a DL signal requiring A/N feedback.

(1) Alt 1: Upon receipt of only one PDSCH/PDCCH (e.g., indicating SPS release) only in a specific one slot (e.g., the first or last slot) (or any slot) within a bundling window corresponding to a PCC (or PCell), a UE may transmit only an A/N corresponding to the PDSCH/PDCCH in a PUCCH format/resource corresponding to the number of corresponding A/N bits.

(2) Alt 2: If the UE has received only one PDSCH/PDCCH (e.g., indicating SPS release) only in a specific one slot (e.g., the first or last slot) (or any slot) of a bundling window corresponding to a PCC (or PCell), and/or if the number of A/N bits corresponding to the PDSCH/PDCCH is equal to or less than X (e.g., 2), the UE may transmit only an A/N corresponding to the PDSCH/PDCCH in a PUCCH format/resource corresponding to the number of A/N bits. Compared to Alt 1, Alt 2 may be limited to the case where one PDSCH/PDCCH is scheduled in a specific DCI format. Herein, the specific DCI format may be a fallback DCI format in which a DCI field configuration is not configurable, like the following DCI type 0. Scheduling a PDSCH by DCI format X may mean that a PDCCH scheduling the PDSCH has DCI format X. Further, scheduling a PDCCH by DCI format X may mean that the PDCCH has DCI format X. When a PDSCH/PDCCH is scheduled by DCI format X, this may also be said that the PDSCH/PDCCH corresponds to DCI format X.

(3) Alt 3: If the UE has received at least one PDSCH/PDCCH (e.g., indicating SPS release) only through a bundling window (or a specific slot set within a corresponding period) corresponding to a PCC (or PCell), the UE may transmit A/N payload corresponding to the bundling window of the PCC (or the specific slot set within the corresponding period) in a PUCCH format/resource corresponding to the size of the A/N payload.

Meanwhile, two types (DCI type 0 and DCI type 1, for the convenience) may be supported for DL scheduling DCI. DCI type 0 may be a non-configuration DCI format in which a DCI field configuration is not configurable. On the contrary, DCI type 1 may be a configurable DCI format in which a DCI field configuration is configurable. The field configuration of DCI type 1 may vary according to a communication mode (e.g., an HARQ-ACK codebook configuration scheme) configured for the UE by a higher layer. DCI type 0 and DCI type 1 may be interchangeably used with their equivalent terms. For example, DCI type 0 may also be referred to as a fallback DCI format. Thus, 1) for DCI type 0, a specific field (e.g., 2 bits) always exist, and when a dynamic A/N codebook is configured, the specific field may be used to indicate a counter-DAI value. Meanwhile, 2) for DCI type 1, when a dynamic A/N codebook is configured, a field indicating a counter-DAI and a total-DAI may be configured, whereas when a semi-static A/N codebook is configured, no field for the usage of DAI indication may not be configured. In the dynamic A/N codebook scheme, the size of an A/N codebook is changed according to the number of actually scheduled DL data. The counter-DAI indicates a CC-wise/slot-wise scheduling order in a CC-first manner, and is used to indicate the position of an A/N bit in an A/N codebook. The total-DAI indicates a slot-wise scheduling accumulative value up to a current slot, and is used to determine the size of the A/N codebook.

Meanwhile, if a semi-static A/N codebook is configured as the A/N codebook configuration scheme, the counter-DAI is not used. Therefore, a specific field of DCI type 0 may be used to indicate (the presence or absence of) a (PUCCH) A/N fallback operation in the situation where the semi-static A/N codebook is configured. That is, the specific field may be used for the usage of indicating a counter-DAI value in the case of dynamic A/N codebook configuration, and for the usage of indicating A/N fallback in the case of semi-static A/N codebook configuration. For the convenience, the specific field may be referred to as a counter-DAI field. Therefore, if the UE has received only (one) DCI type 0 that schedules any CC (or cell) or a specific CC (e.g., PCC) during one bundling window period, for example, in the semi-static A/N codebook configuration situation, the UE may 1) perform a PUCCH A/N fallback operation only for DCI type 0 or an A/N corresponding to DL data scheduled by DCI type 0 (e.g., in the case where the counter-DAI field has a first value (e.g., 1)), or 2) transmit A/N payload of a maximum size (without the PUCCH A/N fallback operation) (e.g., in the case where the counter-DAI field has a value (e.g., 2 to 4) other than the first value), according to a value indicated by the specific field of DCI type 0.

Additionally, when a semi-static A/N codebook is configured, it may be indicated by a 1-bit DAI field of UL grant DCI (transmitted in a specific DCI type) whether to transmit (on a PUSCH scheduled by the DCI) (1) only a 0-bit A/N or the foregoing 1-bit fallback A/N by piggybacking the 0-bit A/N or the 1-bit fallback A/N to the corresponding PUSCH (e.g., by puncturing a UL-SCH or a specific CSI part (e.g., 2)) or 2) the foregoing maximum A/N payload (size) by piggybacking the maximum A/N payload (size) to the corresponding PUSCH (e.g., by rate-matching the UL-SCH and/or CSI). In LTE/-A, an A/N is piggybacked to a PUSCH through puncturing, irrespective of the size of A/N payload. Meanwhile, an A/N is piggybacked to a PUSCH through puncturing or rate-matching according to the size of A/N payload in NR. For example, puncturing may be used for A/N payload of 2 or fewer bits, and rate-matching may be used for A/N payload of 3 or more bits. Meanwhile, due to A/N mismatch between the eNB and the UE, the eNB may expect A/N payload of 3 or more bits, whereas the UE may configure A/N payload of 2 or fewer bits. In this case, the eNB may not decode UL-SCH data and the A/N successfully due to different PUSCH piggyback schemes. Therefore, through a 1-bit DAI field of UL grant DCI, 1) (e.g., if the 1-bit DAI field has a first value (e.g., 0)) a PUSCH A/N fallback operation is performed only for DCI type 0 or an A/N corresponding to DL data scheduled by DCI type 0 (i.e., puncturing is indicated), or 2) (e.g., if the 1-bit DAI field has a second value (e.g., 1)) A/N payload of a maximum size may be transmitted (without the PUSCH A/N fallback operation) (i.e., rate-matching is indicated). In this manner, the mismatch between the PUSCH piggyback schemes (e.g., puncturing and rate-matching) of the eNB and the UE may be prevented.

Figure 11:
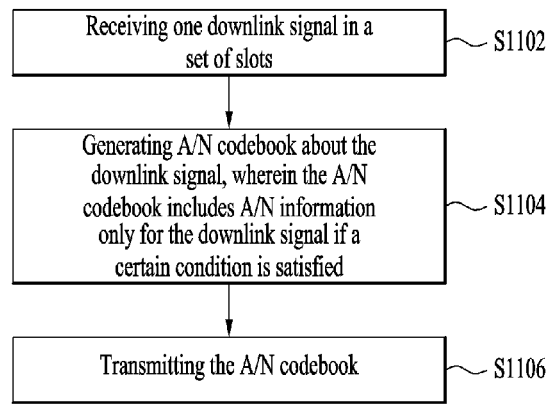
FIGS. 11 and 12 illustrate an exemplary acknowledgement/negative acknowledgement (A/N) procedure according to the present invention.

FIG. 11 illustrates an exemplary A/N transmission scheme according to the present method. In the following operation, a UE may be replaced with (i) a processor of the UE or (ii) a communication modem of the processor.

Referring to FIG. 11, the UE may receive only one DL signal in a set of slots (e.g., a bundling window) (S1102). Subsequently, the UE may generate an A/N codebook for the one or more DL signals (S1104), and then transmit the A/N codebook (S1106). Herein, if a specific condition including the following 1) to 3) is satisfied, the A/N codebook may include only A/N information for the one DL signal:

1) an A/N codebook configuration scheme is configured as a semi-static A/N codebook;
2) the DL signal is received in a primary cell (PCell); and
3) the DL signal is scheduled by a first DCI format, and a specific field of the first DCI format has a first value (e.g., 00 or a value corresponding to 00, that is, an initial value).

The first DCI format includes a DCI format in which the same field configuration is maintained even though the A/N codebook configuration scheme is configured as a dynamic A/N codebook.

If the A/N codebook configuration scheme is configured as a dynamic A/N codebook, the specific field of the first DCI format may include a 2-bit field used to indicate a counter-DAI value. Further, the DL signal may include (i) a PDSCH or (ii) a PDCCH indicating SPS PDSCH release.

Further, if the DL signal is scheduled by a second DCI format, the A/N codebook may include maximum A/N information based on the number of slots in the slot set, the second DCI format may include a DCI format in which the DAI field may be present or absent according to the A/N codebook configuration scheme, and the slot set may include a plurality of slots.

Further, if the A/N codebook is transmitted on a PUSCH, the specific condition may further include the following 4): 4) the PUSCH is scheduled by UL grant DCI including a 1-bit DAI field, wherein the 1-bit DAI field has a second value (e.g., 0).

Figure 12:
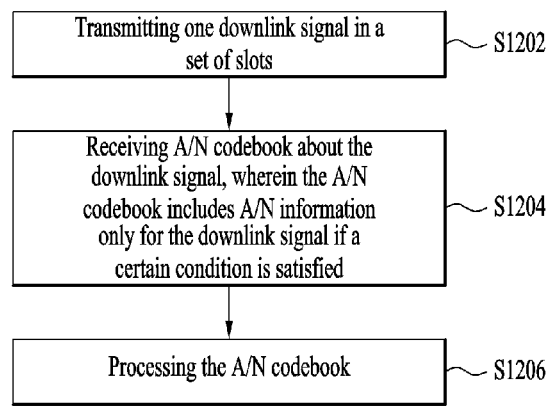

FIG. 12 illustrates an exemplary A/N reception method according to the present method. In the following operation, the eNB may be replaced with (1) a processor of the eNB, or (ii) a communication modem of the processor.

Referring to FIG. 12, the eNB may transmit only one DL signal in a set of slots (S1202). Subsequently, the eNB may receive an A/N codebook for the one or more DL signals (S1204), and then process the A/N codebook (e.g., by decoding, detection, and so on) (S1206). Herein, if a specific condition including the following 1) to 3) is satisfied, the A/N codebook may include only A/N information for the one DL signal:

1) an A/N codebook configuration scheme is configured as a semi-static A/N codebook;
2) the DL signal is transmitted in a primary cell (PCell); and
3) the DL signal is scheduled by a first DCI format, and a specific field of the first DCI format has a first value (e.g., 00 or a value corresponding to 00, that is, an initial value).

The first DCI format includes a DCI format in which the same field configuration is maintained even though the A/N codebook configuration scheme is configured as a dynamic A/N codebook.

If the A/N codebook configuration scheme is configured as a dynamic A/N codebook, the specific field of the first DCI format may be a 2-bit field used to indicate a counter-DAI value. Further, the DL signal may include (i) a PDSCH or (ii) a PDCCH indicating SPS PDSCH release.

Further, if the DL signal is scheduled by a second DCI format, the A/N codebook may include maximum A/N information based on the number of slots in the slot set, the second DCI format may include a DCI format in which the DAI field may be present or absent according to the A/N codebook configuration scheme, and the slot set may include a plurality of slots.

Further, if the A/N codebook is received on a PUSCH, the specific condition may further include the following 4): 4) the PUSCH is scheduled by UL grant DCI including a 1-bit DAI field, wherein the 1-bit DAI field has a second value (e.g., 0).

Meanwhile, as mentioned before, a set of a plurality of slots (or TUs) (available for scheduling/transmission of a PDCCH/PDSCH) linked to the same one A/N transmission slot (or timing) in a semi-static A/N codebook configuration situation may be defined as a bundling window. Further, as mentioned before, an operation of semi-statically pre-configuring a plurality of BWPs in each CC, and indicating/changing an active BWP by dynamically switching the plurality of BWPs in a CA situation may be considered. Further, a scheme of, for each of a plurality of BWPs (configured on a CC basis), individually/independently configuring an HARQ-ACK timing set (e.g., the foregoing A/N delay set) corresponding to PDCCH/PDSCH scheduling/transmission (in the BWP) may be considered. Meanwhile, for a PCC in which an A/N PUCCH transmission is performed in the above situation, an operation of changing an active BWP (in the PCC) during one bundling window period may not be preferable because there is likely to be a mismatch between the UE and the eNB regarding a PUCCH transmission BWP due to the UE's failure in detecting/receiving a PDCCH indicating BWP switching (transmitted by the eNB).

In this regard, change of an active BWP in an SCC, not in the PCC may be allowed during one bundling window period. Accordingly, if BWP switching in the PCC within a bundling window period is indicated (e.g., an indicated PCC BWP switching time is earlier than an A/N transmission time), the UE may drop an A/N transmission corresponding to the bundling window. On the other hand, if BWP switching is indicated only for the SCC during the bundling window period, the UE may perform the A/N transmission corresponding to the bundling window, as is generally done. In consideration of the above operation, a bundling window for a PCC may be determined only on the basis of an HARQ-ACK timing set configured for an active BWP set in the PCC, whereas a bundling window for an SCC may be determined on the basis of the union of a plurality of HARQ-ACK timing sets configured for all BWPs configured in the SCC.

Meanwhile, the above method may be suitable for a TDD system in which one BWP is commonly configured for DL and UL. In an FDD system in which BWPs are configured independently for DL and UL, this method may need a modification. Specifically, in the FDD case, an active UL BWP in an SCC, not in a PCC may be changed during one bundling window period. In this case, compared to the TDD case, an active DL BWP in any CC (including the PCC) may be changed during one bundling window period. Accordingly, if a UL BWP switching operation is indicated for the PCC within the bundling window period (e.g., if an indicated PCC BWP switching time is earlier than an A/N transmission time), the UE may drop an A/N transmission corresponding to the bundling window. On the other hand, if BWP switching is indicated only for the SCC during the bundling window period, the UE may perform the A/N transmission corresponding to the bundling window, as is generally done. In consideration of the above operation, a bundling window for any CC (including the PCC) may be determined on the basis of the union of a plurality of HARQ-ACK timing sets configured for all BWPs configured in the corresponding CC.

In another method, a scheme of configuring a semi-static A/N codebook (A/N payload for the semi-static A/N codebook) on the basis of an active BWP configured/indicated in each CC/cell (an HARQ-ACK timing set and/or a PDSCH candidate set and/or a PDCCH monitoring period, which is configured in the active BWP) may be considered. Herein, if an SCell is deactivated, a BWP in which A/N payload is to be configured for the SCell may have to be determined (i.e., corresponding information may have to match between the UE and the eNB). For this purpose, if the SCell is deactivated, A/N payload may be configured for the SCell on the basis of the following BWPs.

The latest (or first) indicated active BWP for the SCell (before the deactivation).

A BWP with the lowest/highest index (based on RRC-configured BWP indexes).

A BWP having the smallest/largest (maximum) number of corresponding A/N bits (or the smallest/largest number of configured HARQ-ACK timings and/or PDSCH candidates).

A default BWP which is automatically set, when scheduling/transmission for the SCell is inactive during a predetermined time.

[6] Method 6: A/N Feedback Operation in the Case of Configuring SPS-Based Pdsch Transmission.

Unlike legacy LTE/-A, it is considered to configure SPS-based PDSCH transmission in a plurality of CCs (independently on a CC basis) (not limited to a PCC (or PCell) in the NR system. In this case, it may occur that A/N transmissions for a plurality of SPS PDSCHs (received in a plurality of CCs) overlap with each other at the same one time instant according to an SPS PDSCH transmission period and a corresponding A/N transmission time which are configured for each CC. Accordingly, the following methods are proposed to transmit A/Ns for a plurality of (e.g., N) SPS PDSCHs.

(1) Opt 1: An N-bit A/N corresponding to N SPS PDSCHs may be transmitted in a PUCCH format/resource supporting N-bit payload without A/N bundling or dropping.

A. The PUCCH format/PUCCH resource may be configured separately by higher-layer signaling (e.g., RRC signaling), or as a specific one PUCCH resource (e.g., corresponding to a state in which every ARI bit is '0') in an ARI PUCCH resource set corresponding to the size of the N-bit payload.

(2) Opt 2: After the N-bit A/N corresponding to N SPS PDSCHs is bundled into 1 bit or 2 bits, A/N transmission may be performed in a PUCCH format/resource supporting 1-bit/2-bit payload.

A. Bundling may refer to a logical AND operation of a plurality of A/Ns. In the case of bundling into 2 bits, {$1^{st}$ bit, $2^{nd}$ bit} may be configured to be {an A/N for an SPS PDSCH transmitted in a PCC, a bundled A/N for SPS PDSCHs transmitted in an SCC (a plurality of SCCs)} or {a bundled A/N for SPS PDSCHs transmitted in CC group 1, a bundled A/N for SPS PDSCHs transmitted in CC group 2}.

(3) Opt 3: Only a 1-bit or 2-bit A/N corresponding to one or two specific SPS PDSCHs from among N SPS PDSCHs may be transmitted in a PUCCH format/resource supporting 1-bit/2-bit payload.

A. If only a 1-bit A/N is transmitted, an A/N for an SPS PDSCH transmitted in a PCC may be configured as the 1-bit A/N. If only a 2-bit A/N is transmitted, A/Ns for SPS PDSCHs transmitted in the PCC and a specific SCC (e.g., an SCC having the lowest CC (cell) index among SCCs carrying SPS PDSCHs) may be configured as the 2-bit A/N.

Meanwhile, in Opt 2 and Opt 3, a PUCCH format/resource may also be configured separately by higher-layer signaling (e.g., RRC signaling) or may also be configured to be a specific one PUCCH resource of an ARI PUCCH resource set corresponding to the size of 1-bit/2-bit payload.

Meanwhile, it may limited that SPS PDSCHs are transmitted only in up to K CCs (e.g., K=2) during one bundling window (e.g., only one SPS PDSCH is transmitted in each CC during one bundling window). Herein, with SPS PDSCH transmissions configured in the K CCs, the UE may fail to detect/receive any other PDCCH/PDSCH (except for corresponding SPS PDSCHs) during one bundling window. In this case, the UE may map A/N bits in the order of the indexes of the CCs carrying K SPS PDSCHs (e.g., map an A/N corresponding to a low CC index to a low bit index), and transmit a K-bit A/N in a PUCCH format supporting payload of up to K bits. For example, if K=2, an A/N for an SPS PDSCH received in a CC with the lowest index (among CCs carrying SPS PDSCHs) may be mapped to a first bit, and an A/N for an SPS PDSCH received in a CC with the highest index may be mapped to a second bit.

Meanwhile, if a short SPS PDSCH transmission period is configured, a plurality of (e.g., M) SPS PDSCHs may be transmitted in the same one CC during one bundling window. In this case, the UE may map A/N bits for the SPS PDSCHs in the order of the indexes of slots carrying the M SPS PDSCHs (e.g., map an A/N corresponding to a low slot index to a low bit index), and transmit an M-bit A/N in a specific PUCCH format/resource. Further, for a plurality of specific CCs, it may be configured that a plurality of SPS PDSCHs are transmitted in each of the CCs (during a single bundling window). In this case, A/N bits may be mapped in the order of slot indexes in each CC, starting from a low CC index (i.e., slot index first-CC index second mapping). For example, A/N bits corresponding to SPS PDSCHs may be mapped in the order of slot #1 in CC #1⇒slot #2 in CC #1⇒slot #1 in CC #2⇒slot #2 in CC #2 . . . .

Meanwhile, SPS PDSCH transmission may be released starting from slot #(n+K) by a PDCCH indicating (DL) SPS release, transmitted in slot #n. It may occur that an SPS release PDCCH transmission slot and an SPS PDSCH transmission slot are configured within the same one bundling window. In this case, if the eNB has transmitted the SPS release PDCCH but the UE has failed in detecting the PDCCH, the UE still expects an SPS PDSCH transmission from the eNB. As a result, an A/N payload (size) mismatch may occur between the UE and the eNB (due to the mismatch regarding the presence or absence of an A/N for the SPS PDSCH). To overcome the problem, the following methods are proposed.

(1) Option 1

If an SPS release PDCCH transmission slot (detected successfully by the UE) and a slot for which an SPS PDSCH transmission is configured co-exists within the same one bundling window, the UE may configure whole A/N payload by adding X bits corresponding to the SPS PDSCH (e.g., X=1) (irrespective of applying the SPS release command) Therefore, even though there is a slot for which an SPS PDSCH transmission is configured after an SPS release PDCCH transmission slot within the same one bundling window, the UE may configure whole A/N payload by adding X bits (e.g., X=1) corresponding to the SPS PDSCH. The X bits may be mapped to negative ACK/discontinuous transmission (NACK/DTX). Meanwhile, the UE does not configure X bits (e.g., X=1) corresponding to an SPS PDSCH, starting from the bundling window next to the bundling window in which the SPS release PDCCH has been received.

(2) Option 2

It may be limited that an SPS release PDCCH transmission slot and an SPS PDSCH transmission slot are configured only in different bundling windows. Accordingly, the UE may operate, assuming that SPS release PDCCH transmission slot A and SPS PDSCH transmission slot B are not configured in the same one bundling window. If slot A and slot B are configured in a single bundling window, the UE may discard an SPS release PDCCH or drop an A/N transmission corresponding to the corresponding bundling window.

(3) Option 3

If SPS release PDCCH transmission slot A and SPS PDSCH transmission slot B co-exist in the same one bundling window, it may be limited that slot A is configured only on or after a time earlier than slot B by (K−1) slots. Therefore, the UE may operate, assuming that slot A is not configured or of before the time earlier than slot B by K slots. If slot A is configured or or before the time earlier than slot B by K slots, the UE may discard an SPS release PDCCH or drop an A/N transmission corresponding to the corresponding bundling window.

[7] Method 7: The Number of Default DL HARQ Processes and a Default HARQ-ACK Timing Set Unlike LTE/-A, the maximum number of DL HARQ processes may be configured (UE-specifically per CC) by higher-layer signaling (e.g., RRC signaling) in the NR system. Further, an HARQ-ACK timing set (e.g., the foregoing A/N delay set) may also be configured (UE-specifically per CC) by higher-layer signaling (e.g., RRC signaling).

First, regarding the maximum number of DL HARQ processes, it may be necessary to pre-define a default number of DL HARQ processes that the UE should assume/configure to operate until a specific value is configured for the UE (by a UE-specific RRC signal). The default value may be predefined as the minimum (or maximum) of values configurable as the number of DL HARQ processes.

Meanwhile, regarding an HARQ-ACK timing set, it may also be necessary to predefine a default HARQ-ACK timing set that the UE should assume/configure to operate until a specific value is configured for the UE (by a UE-specific RRC signal), or for a PDSCH scheduled by a fallback DCI format. Since the default HARQ-ACK timing set is intended to eliminate a mismatch between the UE and the eNB that might occur mainly during RRC configuration, the default HARQ-ACK timing set is preferably applied only to a fallback DCI format that schedules a PCC. That is, an HARQ-ACK timing set may be set/modified configurably for a fallback DCI format that schedules an SCC.

[8] Method 8: A/N Piggyback on PUSCH Operation in the Case of Configuring a Dynamic A/N Codebook In a dynamic A/N codebook configuration situation, a counter-DAI and/or a total-DAI may be signaled by a DL grant, and a UL DAI indicating the total number of scheduled DL data (from the perspective of eNB scheduling and UE assumption) may be signaled by a UL grant. Meanwhile, all of a DL grant-to-DL data transmission timing (gap), a DL data-to-A/N transmission timing (gap), and a UL grant-to-PUSCH timing (gap) may be indicated dynamically. In this situation, if a DL grant transmission/reception time is later than a transmission/reception time of a UL grant that schedules a PUSCH to which an A/N corresponding to the DL grant will be piggybacked, DL data scheduling/transmission by the DL grant may not be reflected in a UL DAI value that will be signaled by the UL grant.

In this regard, if a DL grant is detected/received at a time instant (in a slot) later than a transmission/reception time (slot) of a UL grant that schedules a PUSCH to which an A/N is to be piggybacked, the UE may determine the size of A/N payload to be piggybacked to the PUSCH on the basis of a counter-DAI and/or a total-DAI signaled by the DL grant (not a UL DAI). Meanwhile, in the absence of a DL grant detected/received at a time instant (in a slot) later than the transmission/reception time (slot) of a UL grant scheduling a PUSCH to which an A/N will be piggybacked, the UE may determine the size of A/N payload to be piggybacked to the PUSCH on the basis of a UL DAI value (signaled by a UL grant corresponding to the PUSCH).

[9] Method 9: A/N Feedback Operation in the Case of Configuring Multi-Slot PDSCH Transmission/Scheduling In the NR system, a multi-slot PDSCH scheduling scheme may be considered, in which the same one PDSCH (or TB) is transmitted across a plurality of slots. In this case, a bundling window (particularly in a semi-static HARQ-ACK codebook) and an A/N payload size corresponding to the bundling window may be configured to be the intersection (A/N bits corresponding to slots corresponding to the intersection) between slots (referred to as ending slots) available for a last PSDCH transmission in one multi-slot PDSCH transmission, and slots linked to/corresponding to an A/N PUCCH transmission slot (slots available for PDCCH/PDSCH scheduling/transmission) (Option 1). In this case, for one bundling window, A/N bits corresponding to a maximum number of multi-slot PDSCHs non-overlapped in time (within the bundling window) may be configured. Therefore, the "slot available for the last PDSCH transmission" may be determined only in consideration of the non-overlapped multi-slot PDSCH candidates (Option 2). Further, only one multi-slot PDSCH transmission may be allowed during one bundling window. Accordingly, if multi-slot PDSCH transmission/scheduling is configured, an A/N bit corresponding to a single multi-slot PDSCH may be configured for each bundling window (Option 3).

In an example of the proposal, it may be assumed that (DL) slot indexes linked to A/N PUCCH transmission slots are set to {1, 2, 3, 4, 5, 6, 7, 8, 9, 10}, four slots are configured for one multi-slot PDSCH transmission (e.g., one multi-slot PDSCH may be configured with slot indexes 1/2/3/4 or 4/5/6/7 or 7/8/9/10), and slot indexes available for the last PDSCH transmission of the multi-slot PDSCH are set to {4, 7, 10}. In Option 1, slot indexes {4, 7, 10} corresponding to the intersection between the slot indexes {1, 2, 3, 4, 5, 6, 7, 8, 9, 10} and the slot indexes {4, 7, 10} are configured as one bundling window, and A/N bits corresponding to three slots with the slot indexes {4, 7, 10} may be configured. Meanwhile, in Option 2, the intersection between the slot indexes {1, 2, 3, 4, 5, 6, 7, 8, 9, 10} and slot indexes {4, 10} available for the last PDSCH transmission of a non-overlapped multi-slot PDSCH (e.g., including slot indexes 1/2/3/4 or 7/8/9/10) is (up to) two slots. Thus, A/N bits corresponding to two non-overlapped multi-slot PDSCHs may be configured.

Meanwhile, there may need for a scheme of defining a multi-slot PDSCH candidate set corresponding to each A/N bit determined in Option 2 (i.e., A/Ns corresponding to one or more multi-slot PDSCH candidates are mapped to the same one bit). For this purpose, for example, a set (hereinafter, referred to Set #1) of a multi-slot PDSCH candidate having the last ending (or starting) slot and a multi-slot PDSCH candidate overlapped in time with this multi-slot PDSCH candidate may correspond to the same one A/N bit, A/N bit #1 (e.g., the last bit in payload). Then, a set (hereinafter, referred to Set #2) of a multi-slot PDSCH candidate having the last ending (or starting) slot except for Set #1 and a multi-slot PDSCH candidate overlapped in time with this multi-slot PDSCH candidate may correspond to the same one A/N bit, A/N bit #2 (e.g., the second last bit in the payload). In this manner, the mapping relationships between PDSCH candidates (PDSCH candidate sets) and A/N bits may be determined sequentially. In another example, a set (hereinafter, referred to Set #1) of a multi-slot PDSCH candidate having the earliest starting (or ending) slot and a multi-slot PDSCH candidate overlapped in time with this multi-slot PDSCH candidate may correspond to the same one A/N bit, A/N bit #1 (e.g., the first bit in payload). Then, a set (hereinafter, referred to Set #2) of a multi-slot PDSCH candidate having the earliest starting (or ending) slot except for Set #1 and a multi-slot PDSCH candidate overlapped in time with this multi-slot PDSCH candidate may correspond to the same one A/N bit, A/N bit #2 (e.g., the second bit in the payload). In this manner, the mapping relationships between PDSCH candidates (PDSCH candidate sets) and A/N bits may be determined sequentially.

The above PDSCH candidate-to-A/N bit mapping method may be applied in a similar manner to a case in which a plurality of (symbol-level) PDSCH candidates are configured in one slot. In this case, it may be assumed that A/N bits corresponding to the maximum number of PDSCHs that are not overlapped in time in one slot are configured as A/N payload for the slot. For this purpose, for example, a set (hereinafter, referred to Set #1) of a PDSCH candidate having the last ending (or starting) symbol and a PDSCH candidate overlapped in time with this PDSCH candidate may correspond to the same one A/N bit, A/N bit #1 (e.g., the last bit in payload). Then, a set (hereinafter, referred to Set #2) of a PDSCH candidate having the last ending (or starting) symbol except for Set #1 and a PDSCH candidate overlapped in time with this PDSCH candidate may correspond to the same one A/N bit, A/N bit #2 (e.g., the second last bit in the payload). In this manner, the mapping relationships between PDSCH candidates (PDSCH candidate sets) and A/N bits may be determined sequentially. In another example (in the opposite case), a set (hereinafter, referred to Set #1) of a PDSCH candidate having the earliest starting (or ending) symbol and a PDSCH candidate overlapped in time with this PDSCH candidate may correspond to the same one A/N bit, A/N bit #1 (e.g., the first bit in payload). Then, a set (hereinafter, referred to Set #2) of a PDSCH candidate having the earliest starting (or ending) symbol except for Set #1 and a PDSCH candidate overlapped in time with this PDSCH candidate may correspond to the same one A/N bit, A/N bit #2 (e.g., the second bit in the payload). In this manner, the mapping relationships between PDSCH candidates (PDSCH candidate sets) and A/N bits may be determined sequentially.

Meanwhile, if a plurality of (symbol-level) PDSCH candidates are configured in one slot, an A/N for an SPS release PDCCH detected/received in the slot may be mapped to an A/N bit corresponding to a specific (e.g., lowest or highest) PDSCH candidate index in the slot or a specific (e.g., the first or last) bit of A/N payload corresponding to the slot.

[10] Method 10: Configuration of UE Processing Time in Cross-CC Scheduling Between Different SCSs First, the number of OFDM symbols corresponding to the time gap between a DL data reception (ending) time and a corresponding HARQ-ACK transmission (starting) time is defined as a DL processing time N1, and the number of OFDM symbols corresponding to the time gap between a UL grant reception (ending) time and a corresponding UL data transmission (starting) time is defined as a UL processing time N2. (N1, N2) may be determined to be different values according to an SCS (e.g., 15, 30, 60, or 120 [KHz]) used for DL/UL data (and/or HARQ-ACK or UL grant) transmission, a DMRS mapping pattern (symbol positions) configured for demodulation of a DL/UL data signal, a scheme of mapping a DL/UL data signal to REs (e.g., a frequency-first or time-first scheme), and/or a ratio of a scheduled DL/UL data transport block size (TBS) to a peak data rate (i.e., a TBS ratio).

Meanwhile, data channels/signals and control channels/signals corresponding to (N1, N2) may be configured to be transmitted in the same one CC, or in different CCs (in a CA situation). In this case, different SCSs may be configured for the two channels/signals. For example, in the case of N1, different SCSs may be used for DL data (a PDSCH) and a corresponding HARQ-ACK (a PUCCH). Further, in the case of N2, different SCSs may be used for UL grant DCI (a PDCCH) and corresponding UL data (a PUSCH). Further, different SCSs may also be used for DL grant DCI (a PDCCH) and DL data (a PDSCH) scheduled by the DL grant DCI, and a PDCCH decoding ending time and a PDSCH decoding starting time may vary according to the SCS difference between the PDCCH and the PDSCH. For example, as the SCS of the PDCCH is larger, the PDCCH decoding ending time and the PDSCH decoding starting time may become delayed. As a consequence, N1 may be defined/configured as a different value according to the SCS difference between a PDCCH and a PDSCH.

In this regard, the DL processing time between DL data (PDSCH) using SCS $S_d$ and a corresponding HARQ-ACK (PUCCH) may be defined as N'1, and SCS $S_e$ used for DL grant DCI (PDCCH) that schedules the DL data (PDSCH) may be set to a different value from SCS $S_d$. In this case, the sum (N1'+$N_o$) of N1' and the number of symbols corresponding to No may be defined/configured as N1 for the DL data (PDSCH).

$N_o$=floor($S_d/S_e$) or $N_o$=ceil($S_d/S_e$)
$N_o$=$N_n$×floor($S_d/S_e$) or $N_o$=$N_n$×ceil($S_d/S_e$)
$N_o$=floor($S_d/S_e$)-$N_o$' or $N_o$=ceil($S_d/S_e$)-$N_o$'
$N_o$=$N_n$×floor($S_d/S_e$)-$N_o$' or $N_o$=$N_n$×ceil($S_d/S_e$)-$N_o$'
$N_o$=$N_n$×{floor($S_d/S_e$)-$N_o$'} or $N_o$=$N_n$×{ceil($S_d/S_e$)-$N_o$'}

Herein, $N_n$ represents the number of symbols included in a PDCCH (resource period) (e.g., $N_n$=1, 2, 3), and $N_o$' represents the number of specific symbols (e.g., $N_o$'=1). In addition, N1', $N_o$, and/or N1 may be determined to be the number of SCS-based symbols used/configured for transmission of an HARQ-ACK (PUCCH). Further, floor(X) represents the largest integer equal to or less than X, and ceil(X) represents the smallest integer equal to or larger than X.

Additionally, regarding a CSI feedback operation, a minimum UE processing time between reception of (the last symbol of) DCI/PDCCH triggering CSI report transmission and/or a DL RS in which CSI is measured and transmission of a CSI reporting PUCCH/PUSCH (the starting symbol of the channel or a starting symbol in which a CSI signal is mapped/transmitted in the channel) may be defined as N3. Then, if N3 is not satisfied (i.e., the gap between the last symbol of the DCI/PDCCH or the DL RS and the starting symbol of the CSI (PUCCH/PUSCH) transmission is less than N3), the UE may transmit an invalid CSI report (e.g., a CSI feedback which has not been updated or reported previously/recently) (on a scheduled/indicated PUCCH/PUSCH), or drop the CSI report transmission.

Meanwhile, a method of indicating the index of a BWP carrying DL data (PDSCH) scheduled by DL grant DCI (PDCCH), and the index (referred to as a PDSCH start delay) of a starting slot/symbol of transmission of the DL data (PDSCH) by the DL grant DCI (PDCCH) may be considered. Herein, the PDSCH start delay may refer to the delay from the last symbol used for PDCCH transmission to the first symbol of PDSCH transmission. If a BWP carrying the PDCCH is different from the BWP carrying the PDSCH (indicated by the PDCCH), a BWP switching delay (caused by RF tuning or the like) may occur. Herein, if the PDSCH start delay is indicated as less than a specific value, the starting time of reception (buffering) of the PDSCH signal may be delayed, thereby degrading the performance of PDSCH reception/decoding. Herein, the specific value includes a value corresponding to the BWP switching delay.

In the case of DL data (PDSCH) scheduling/transmission involving BWP switching, it may be limited that only a PDSCH start delay equal to or larger than a specific value is indicated by DL grant DCI (PDCCH) scheduling a PDSCH. Herein, the specific value includes a value corresponding to the BWP switching delay. Therefore, if a PDSCH start delay equal to or larger than the specific value is indicated by a PDCCH, the UE may receive a PDSCH signal in a switched BWP after BWP switching. Otherwise (i.e., if a PDSCH start delay less than the specific value is indicated), the UE may 1) discard the PDCCH (i.e., drop both of the BWP switching the PDSCH reception), or 2) perform the BWP switching, while dropping the PDSCH reception. In another method, if with no restriction imposed on indication of a PDSCH start delay, a PDSCH start delay less than a specific value is indicated, the UE may receive (and decode) only part of a (scheduled) PDSCH signal in a switched BWP after BWP switching. Herein, the specific value includes a value corresponding to the BWP switching delay.

Figure 13:
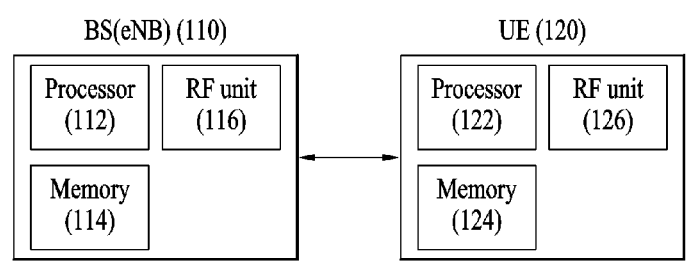
FIG. 13 illustrates a base station and a user equipment applicable to an embodiment of the present invention.

FIG. 13 illustrates a BS and a UE of a wireless communication system, which are applicable to embodiments of the present invention.

Referring to FIG. 13, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method of performing communication by a user equipment (UE) in a wireless communication system, the method comprising:
receiving only one downlink signal in a set of slots;
generating an acknowledgement/negative acknowledgement (A/N) codebook for one or more downlink signals; and
transmitting the A/N codebook,
wherein if the following conditions 1) to 3) are satisfied, the A/N codebook is generated for only the one downlink signal,
1) an A/N codebook configuration scheme is set as a semi-static A/N codebook,
2) the one downlink signal is received in a primary cell (PCell), and
3) the one downlink signal is scheduled by a first downlink control information (DCI) format of at least two DCI formats, and a specific field of the first DCI format has a first value, and
wherein a field configuration of the first DCI format is same when the A/N codebook configuration scheme is dynamic and when the A/N codebook configuration scheme is semi-static.

2. The method according to claim 1, wherein if the A/N codebook configuration scheme is dynamic, the specific field of the first DCI format indicates a counter-downlink assignment index (c-DAI) value.

3. The method according to claim 1, wherein the one downlink signal includes (i) a physical downlink shared channel (PDSCH) or (ii) a physical downlink control channel (PDCCH) indicating semi-persistent scheduling (SPS) PDSCH release.

4. The method according to claim 1, wherein if the one downlink signal is scheduled by a second DCI format of the at least two DCI formats, the A/N codebook includes maximum A/N information based on the number of slots included in the slot set, the second DCI format includes a c-DAI field when the A/N codebook configuration scheme is dynamic or no c-DAI field when the A/N codebook configuration scheme is semi-static, and the slot set includes a plurality of slots.

5. The method according to claim 1, wherein if the A/N codebook is transmitted on a physical uplink shared channel (PUSCH), the following additional condition 4) must be satisfied for the A/N codebook to be generated for only the one downlink signal, 4) the PUSCH is scheduled by an uplink (UL) grant DCI including a DAI field, and the DAI field has a second value.

6. The method according to claim 1, wherein the field configuration of a second DCI format, of the at least two DC formats, includes the specific field when the A/N codebook configuration scheme is dynamic, and does not include the specific field when the A/N codebook configuration scheme is semi-static.

7. A user equipment (UE) in a wireless communication system, the UE comprising:
a radio frequency (RF) module; and
a processor,
wherein the processor is configured to receive only one downlink signal in a set of slots, generate an acknowledgement/negative acknowledgement (A/N) codebook for one or more downlink signals, and transmit the A/N codebook,
wherein if the following conditions 1) to 3) are satisfied, the A/N codebook is generated for only the one downlink signal,
1) an A/N codebook configuration scheme is set as a semi-static A/N codebook,
2) the one downlink signal is received in a primary cell (PCell), and
3) the one downlink signal is scheduled by a first downlink control information (DCI) format of at least two DCI formats, and a specific field of the first DCI format has a first value, and
wherein a field configuration of the first DCI format is same when the A/N codebook configuration scheme is dynamic and when the A/N codebook configuration scheme is semi-static.

8. The UE according to claim 7, wherein if the A/N codebook configuration scheme is dynamic, the specific field of the first DCI format indicates a counter-downlink assignment index (c DAI) value.

9. The UE according to claim 7, wherein the one downlink signal includes (i) a physical downlink shared channel (PDSCH) or (ii) a physical downlink control channel (PDCCH) indicating semi-persistent scheduling (SPS) PDSCH release.

10. The UE according to claim 7, wherein if the one downlink signal is scheduled by a second DCI format of the at least two DCI formats, the A/N codebook includes maximum A/N information based on the number of slots included in the slot set, the second DCI format includes a c-DAI field when the A/N codebook configuration scheme is dynamic or no c-DAI field when the A/N codebook configuration scheme is semi-static, and the slot set includes a plurality of slots.

11. The UE according to claim 6, wherein if the A/N codebook is transmitted on a physical uplink shared channel (PUSCH), the following additional condition 4) must be satisfied for the A/N codebook to be generated for only the one downlink signal, 4) the PUSCH is scheduled by an uplink (UL) grant DCI including a DAI field, and the DAI field has a second value.

12. The UE according to claim 7, wherein the field configuration of a second DCI format, of the at least two DC formats, includes the specific field when the A/N codebook configuration scheme is dynamic, and does not include the specific field when the A/N codebook configuration scheme is semi-static.

13. A base station (BS) in a wireless communication system, the BS comprising:

a radio frequency (RF) module; and
a processor,
wherein the processor is configured to transmit only one downlink signal in a set of slots, receive an acknowledgement/negative acknowledgement (A/N) codebook for one or more downlink signals, and process the A/N codebook,
wherein if the following conditions 1) to 3) are satisfied, the A/N codebook is generated for only the one downlink signal,
1) an A/N codebook configuration scheme is set as a semi-static A/N codebook,
2) the one downlink signal is received in a primary cell (PCell), and
3) the one downlink signal is scheduled by a first downlink control information (DCI) format of at least two DCI formats, and a specific field of the first DCI format has a first value, and
wherein a field configuration of the first DCI format is same when the A/N codebook configuration scheme is dynamic and when the A/N codebook configuration scheme is semi-static.

14. The BS according to claim 13, wherein if the A/N codebook configuration scheme is dynamic, the specific field of the first DCI format indicated a counter-downlink assignment index (c DAI) value.

15. The BS according to claim 13, wherein the one downlink signal includes (i) a physical downlink shared channel (PDSCH) or (ii) a physical downlink control channel (PDCCH) indicating semi-persistent scheduling (SPS) PDSCH release.

16. The BS according to claim 13, wherein if the one downlink signal is scheduled by a second DCI format of the at least two DCI formats, the A/N codebook includes maximum A/N information based on the number of slots included in the slot set, the second DCI format includes a c-DAI field when the A/N codebook configuration scheme is dynamic or no c-DAI field when the A/N codebook configuration scheme is semi-static, and the slot set includes a plurality of slots.

17. The BS according to claim 13, wherein if the A/N codebook is transmitted on a physical uplink shared channel (PUSCH), the following additional condition 4) must be satisfied for the A/N codebook to be generated for only the one downlink signal,
4) the PUSCH is scheduled by an uplink (UL) grant DCI including a DAI field, and the DAI field has a second value.

18. The BS according to claim 13, wherein the field configuration of a second DCI format, of the at least two DC formats, includes the specific field when the A/N codebook configuration scheme is dynamic, and does not include the specific field when the A/N codebook configuration scheme is semi-static.

* * * * *